(12) United States Patent
Masumura

(10) Patent No.: US 11,630,070 B2
(45) Date of Patent: Apr. 18, 2023

(54) INSPECTION AND MEASUREMENT SYSTEM, AND INSPECTION AND MEASUREMENT METHOD

(71) Applicant: MACHINE VISION LIGHTING INC., Tokyo (JP)

(72) Inventor: Shigeki Masumura, Tokyo (JP)

(73) Assignee: MACHINE VISION LIGHTING INC., Tokyo (JP)

( * ) Notice: Subject to any disclaimer, the term of this patent is extended or adjusted under 35 U.S.C. 154(b) by 48 days.

(21) Appl. No.: 17/618,216

(22) PCT Filed: Jun. 15, 2020

(86) PCT No.: PCT/JP2020/023440
§ 371 (c)(1),
(2) Date: Dec. 10, 2021

(87) PCT Pub. No.: WO2021/255793
PCT Pub. Date: Dec. 23, 2021

(65) Prior Publication Data
US 2022/0170863 A1    Jun. 2, 2022

(30) Foreign Application Priority Data
Jun. 14, 2020 (JP) .............................. JP2020-102749

(51) Int. Cl.
*G01N 21/88* (2006.01)
*G01B 11/25* (2006.01)

(52) U.S. Cl.
CPC ......... *G01N 21/8806* (2013.01); *G01B 11/25* (2013.01)

(58) Field of Classification Search
CPC ...... G01N 21/53; G08B 17/107; G06T 17/10; G06T 17/20; G06T 2207/10028;
(Continued)

(56) References Cited

U.S. PATENT DOCUMENTS

| 10,598,603 B2 | 3/2020 | Masumura |
| 10,883,944 B2 | 1/2021 | Masumura |

(Continued)

FOREIGN PATENT DOCUMENTS

| CN | 108662993 A | 10/2018 |
| JP | 6-66528 A | 3/1994 |

(Continued)

OTHER PUBLICATIONS

OA2_JP2020-102749_JP dated Sep. 8, 2020.
(Continued)

*Primary Examiner* — Tri T Ton
(74) *Attorney, Agent, or Firm* — Dilworth & Barrese, LLP

(57) ABSTRACT

[Problem] When the inclination of an object surface reaches or exceeds a certain level, direct light consisting of a specularly reflected light component leaves the range of the solid observation angle formed by the observation optical system, and it becomes difficult to continuously and quantitatively obtain the surface shape of the object surface.
[Solution] This invention emits emission light capable of, within an observation range for an object under inspection, simultaneously forming the same solid emission angle on each point on an object surface regardless of the distance from the illumination; for a non-continuous area where direct light is not returned, uses variation in the solid angle of direct light unique to the vicinity of the non-continuous area to make it possible to at least measure height-direction variation of the non-continuous area; and uses brightness information indicating variation in a scattered light component of object light from the non-continuous area to make it possible to continuously acquire the three-dimensional shape of the non-continuous area.

8 Claims, 20 Drawing Sheets

In outer housing of device, as shown by dashed lines, positions of first shielding mask M1 including first filtering means F1 and third filtering means F3, second shielding mask M2 including fourth filtering means, and surface light source 1 including light-emitting face 11 can each be adjusted by being moved forward and rearward relative to lens 2, and can be fixed.

(58) Field of Classification Search
CPC . G06T 2207/10032; G06T 2207/10044; G06T 2207/30184; G06T 7/521
USPC ............. 356/356, 237.1–237.6, 239.1–239.8
See application file for complete search history.

(56) References Cited

U.S. PATENT DOCUMENTS

| | | |
|---|---|---|
| 2004/0184653 A1 | 9/2004 | Baer et al. |
| 2017/0067835 A1 | 3/2017 | Masumura |
| 2017/0086783 A1 | 3/2017 | Masumura |

FOREIGN PATENT DOCUMENTS

| | | |
|---|---|---|
| JP | 2002-257523 A | 9/2002 |
| JP | 5866573 | 2/2016 |
| JP | 5866573 B1 | 2/2016 |
| JP | 2017-062120 A | 3/2017 |
| JP | 2019-100930 A | 6/2019 |

OTHER PUBLICATIONS

WOISA_JP from PCT/JP2020/023440 dated Jul. 21, 2020.
ISR_JP from PCT/JP2020/023440.
OA1_JP2020-102749 dated Jul. 8, 2020.

In outer housing of device, as shown by dashed lines, positions of first shielding mask M1 including first filtering means F1 and third filtering means F3, second shielding mask M2 including fourth filtering means, and surface light source 1 including light-emitting face 11 can each be adjusted by being moved forward and rearward relative to lens 2, and can be fixed.

FIG. 4

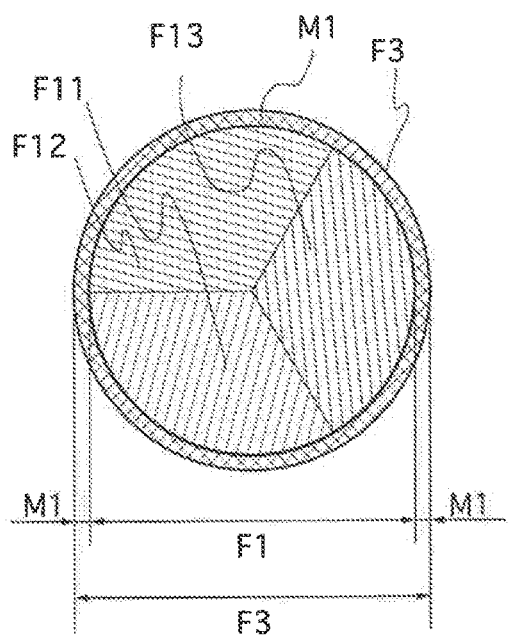

M1 : Shielding portion

F13, F12, F11 : Portions that each transmit only light having specific wavelength band or polarization or that each have specific transmittance

* First shielding mask M1 denotes mask of shielding portion, first filtering means F1 denotes portion, within aperture, that transmits only light having specific wavelength band or polarization or that has specific transmittance, and third filtering means F3 denotes irradiation solid angle forming means as a whole that integrates both.

* Except for first shielding mask, M1 of shielding portion may also function as portion that transmits only light having specific wavelength band or polarization or that has specific transmittance.

FIG. 5
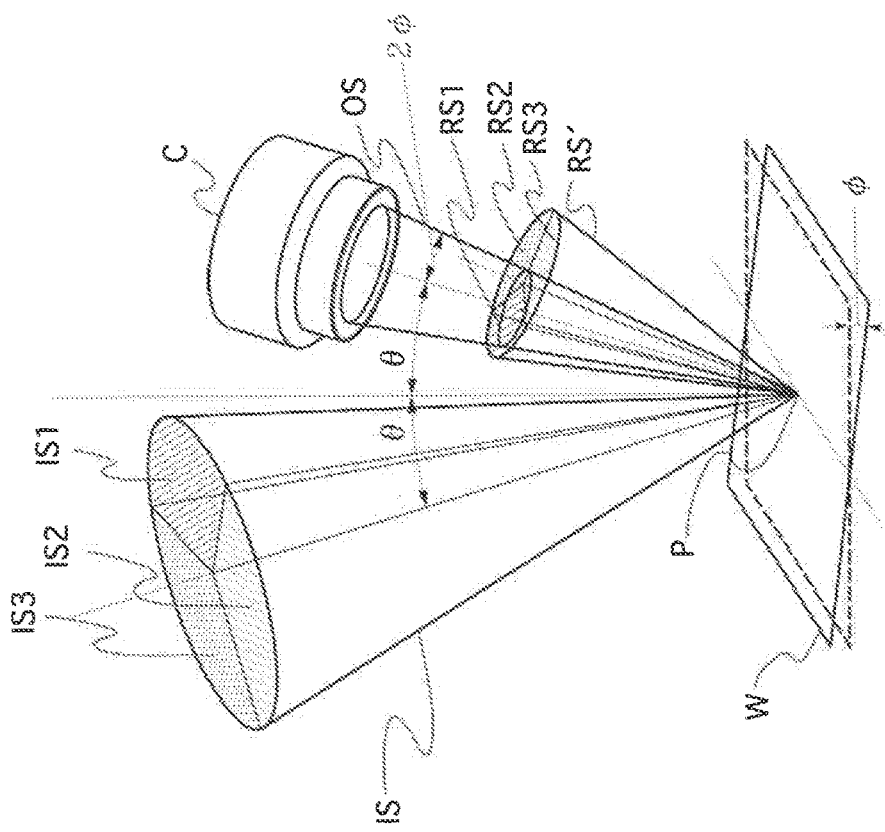
(a) When inspection surface is planar, optical axis of reflected light and optical axis of observation solid angle coincide with each other.
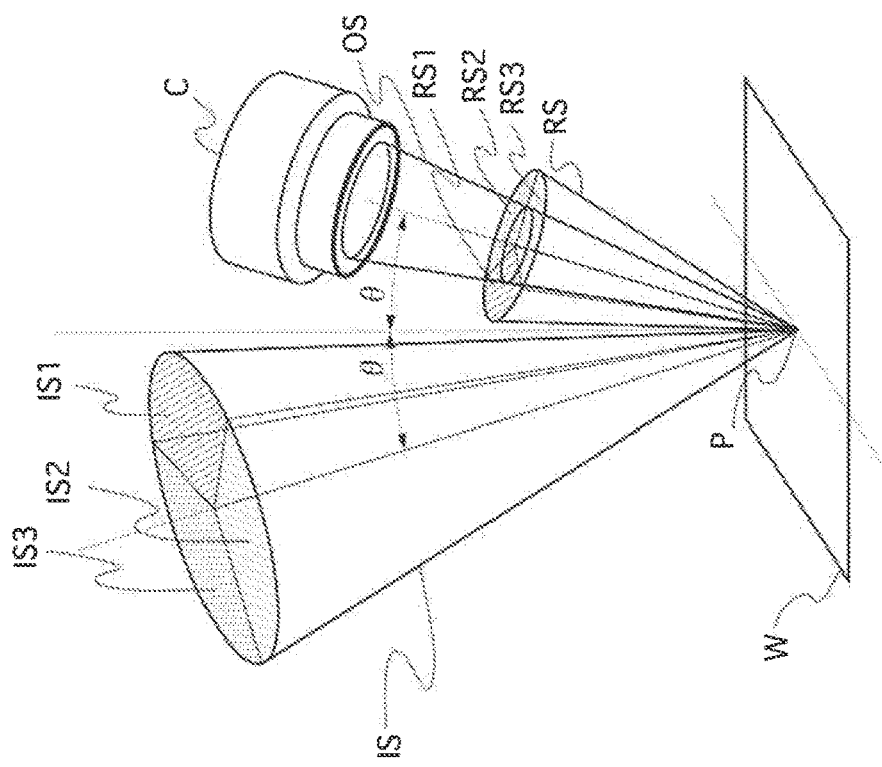
(b) When inspection surface is inclined, optical axis of reflected light is shifted from optical axis of observation solid angle.

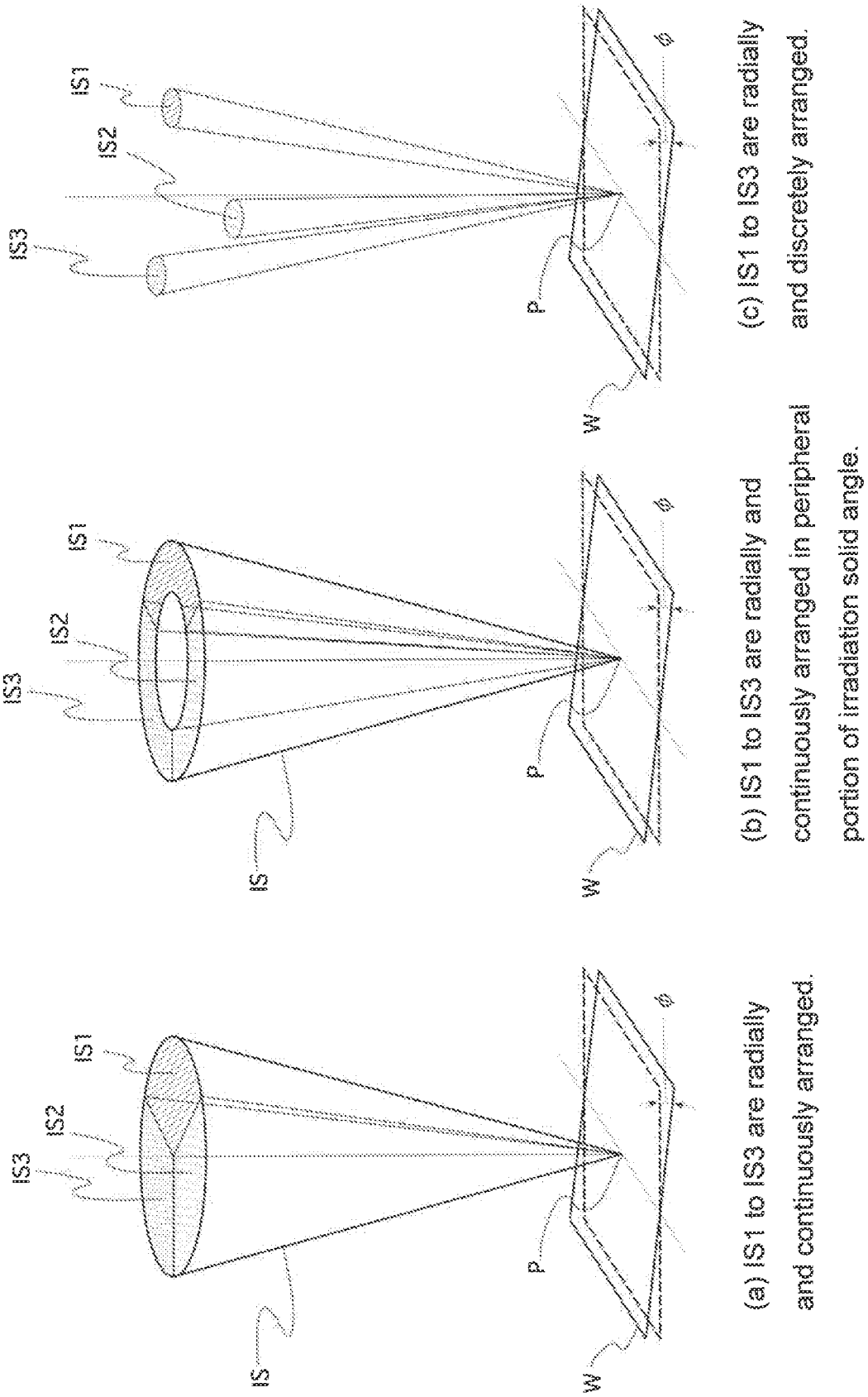

FIG. 7

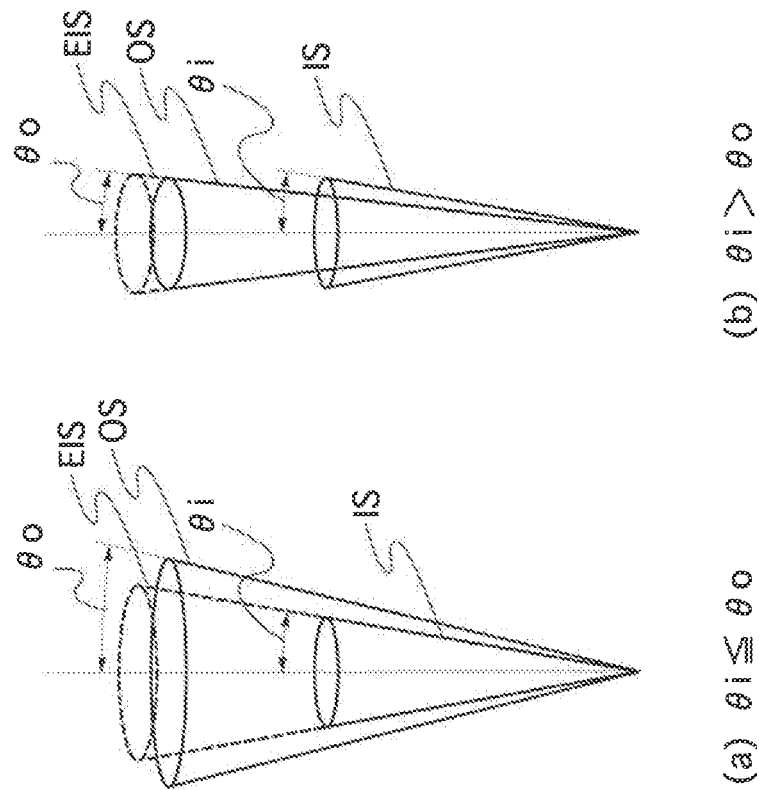

Effective half plane angle: θ = min(θi, θo)

* If optical axes of irradiation solid angle and observation solid angle coincide with each other, or extend in directions of regular reflection, with regard to direct light returned from object, object light corresponding to effective irradiation solid angle EIS that varies within range of effective half plane angle θ that is smaller one of half plane angle θi of irradiation solid angle and half plane angle θo of observation solid angle can be sensed as contrast information thereof.

(a) θi ≦ θo (b) θi > θo

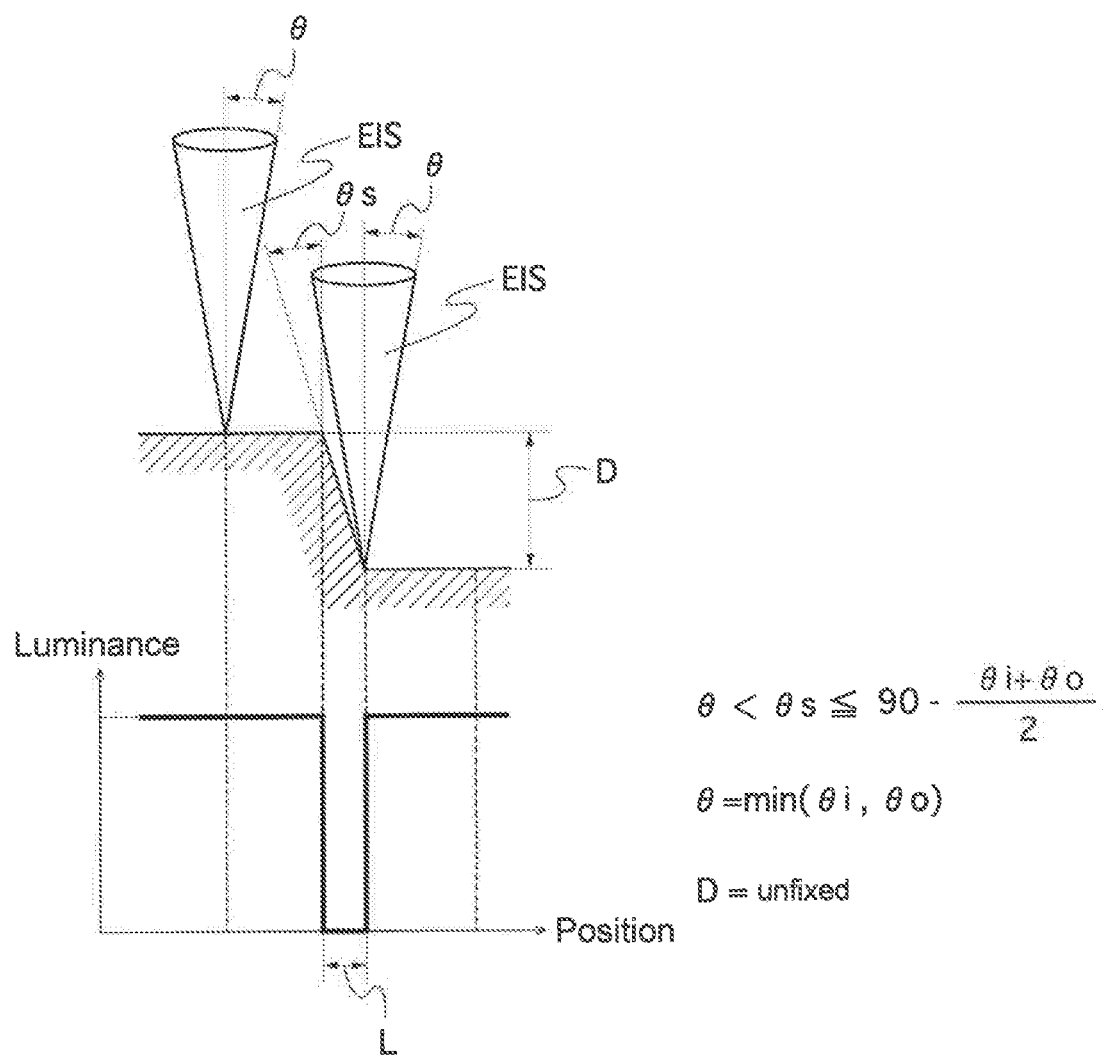

FIG. 13
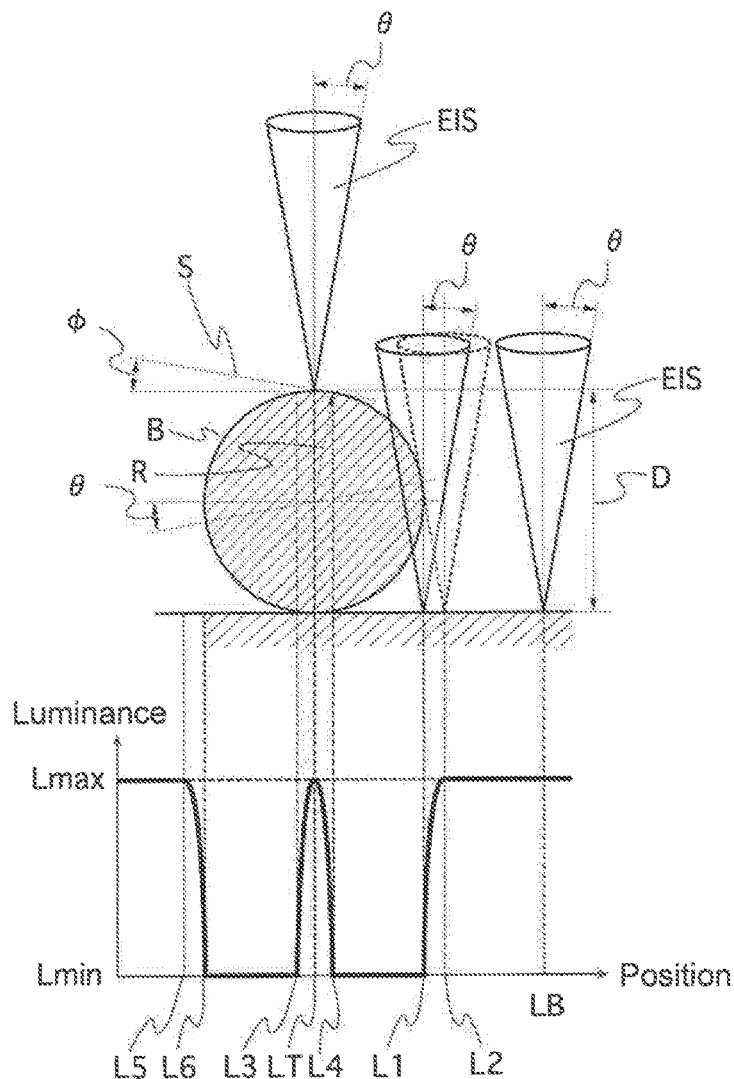
$$\phi = \frac{\theta i + \theta o}{2}$$
$$\theta = \min(\theta i, \theta o)$$
$$r1 = L4 - LT = \frac{L4 - L3}{2}$$
$$r2 = L1 - LT = \frac{L1 - L6}{2}$$
$$R1 = \frac{r1}{\sin \phi}$$
$$R2 = r2$$
$$R3 = \frac{r3 \cos \theta}{\sin \theta - \cos \theta + 1}$$
$$R = R1 = R2 = R3$$
$$D = 2R$$
$$= R + \frac{r3 - \Delta L}{\tan \theta}$$
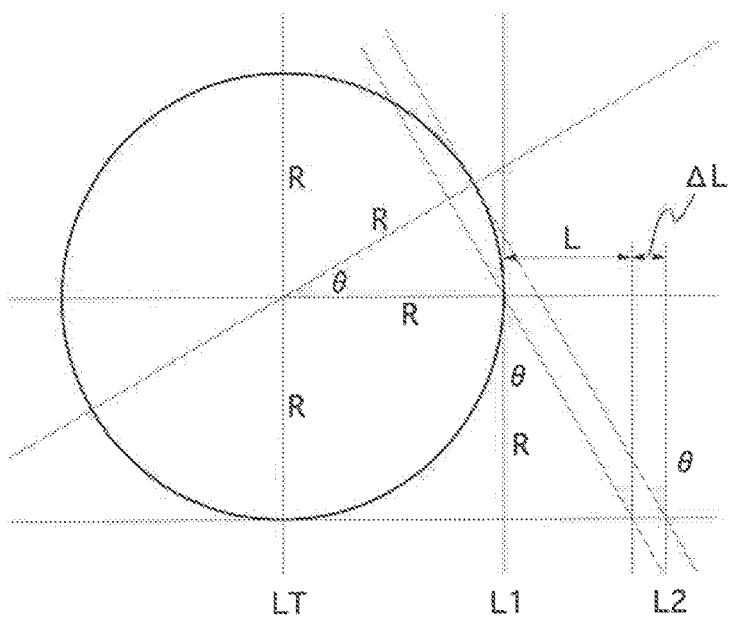
$$r3 = L + \Delta L$$
$$= L2 - L1$$
$$= L6 - L5$$
$$L = R \tan \theta$$
$$\Delta L = \frac{R(1 - \cos \theta)}{\cos \theta}$$

FIG. 16

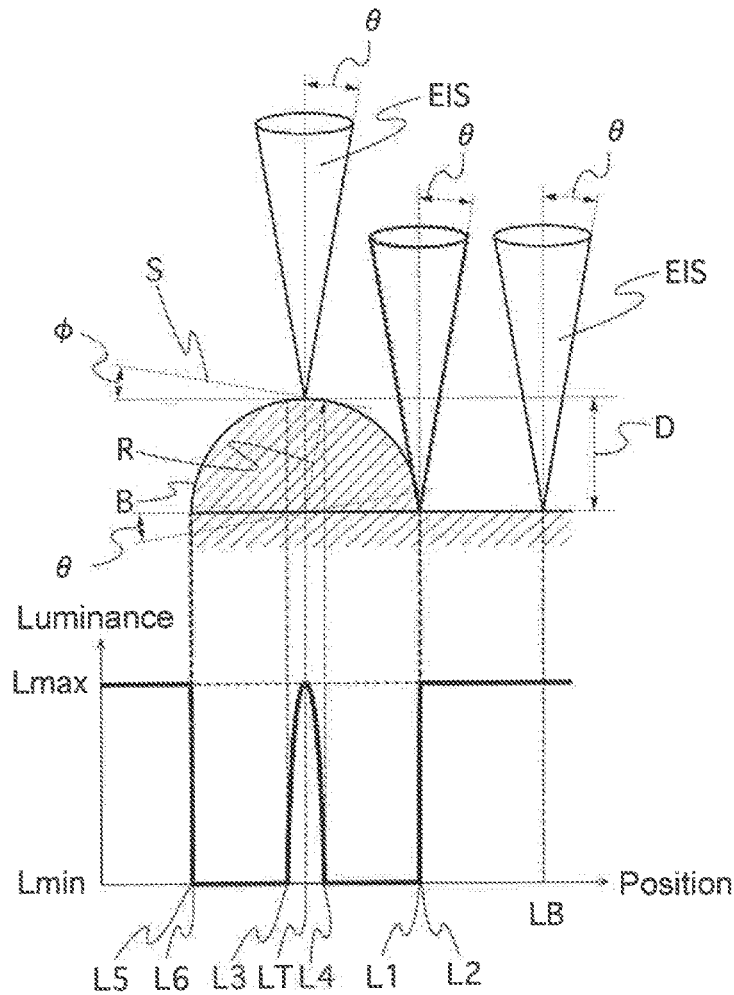

$$\phi = \frac{\theta i + \theta o}{2}$$

$$\theta = \min(\theta i, \theta o)$$

$$r1 = L4 - LT = \frac{L4 - L3}{2}$$

$$r2 = L1 - LT = \frac{L1 - L6}{2}$$

$$R1 = \frac{r1}{\sin\phi}$$

$$R2 = r2$$

$$R3 = \frac{r3 \cos\theta}{\sin\theta - \cos\theta + 1}$$

$$R1 = R2 \quad, \quad R3 \fallingdotseq 0$$

$$R = R1 = R2$$

$$D = R$$
$$= R + \frac{r3 - \Delta L}{\tan\theta}$$

$$r3 = \Delta L$$

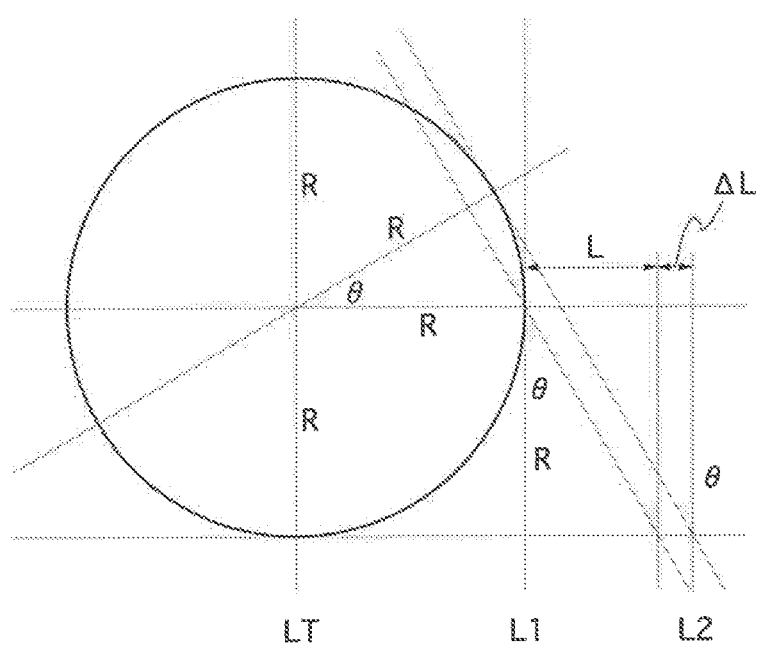

$$\Delta L = \frac{R(1 - \cos\theta)}{\cos\theta}$$

$$\tan\theta = \frac{L}{\Delta D1 + R}$$

FIG. 17

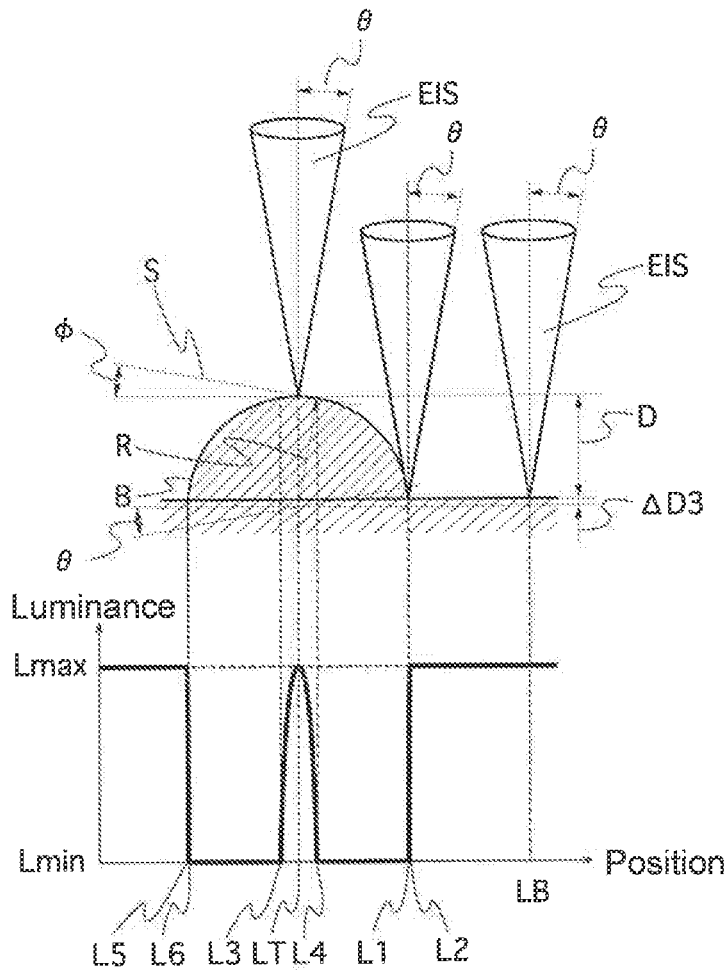

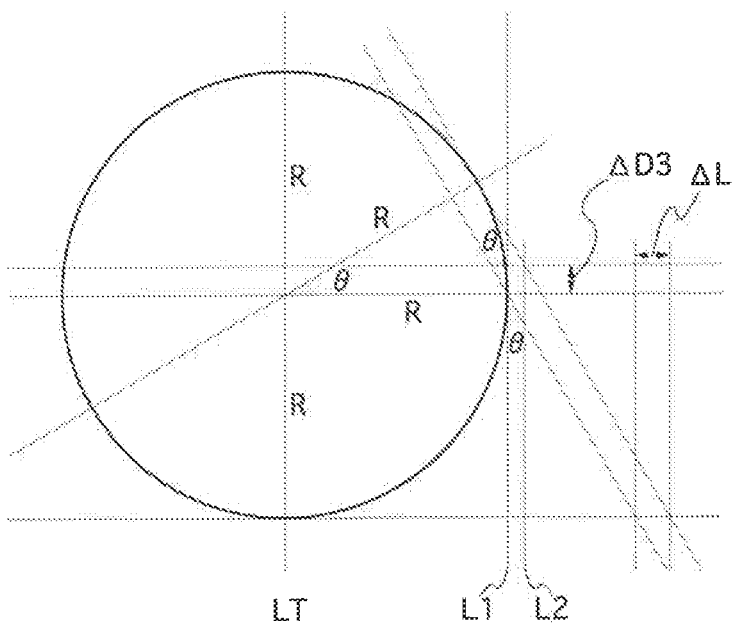

$$\phi = \frac{\theta i + \theta o}{2}$$

$$\theta = \min(\theta i, \theta o)$$

$$r1 = L4 - LT = \frac{L4 - L3}{2}$$

$$r2 = L1 - LT = \frac{L1 - L6}{2}$$

$$R1 = \frac{r1}{\sin \phi}$$

$$R2 = r2$$

$$R3 = \frac{r3 \cos \theta}{\sin \theta - \cos \theta + 1}$$

$$R1 > R2, \ 0 \leq R3 < \Delta L$$

$$R = R1$$

$$D = R - \Delta D3$$

$$= R + \frac{r3 - \Delta L}{\tan \theta}$$

$$r3 = L2 - L1 = L6 - L5$$

$$\Delta L = \frac{R(1 - \cos \theta)}{\cos \theta}$$

$$\tan \theta = \frac{L}{\Delta D1 + R}$$

FIG. 18
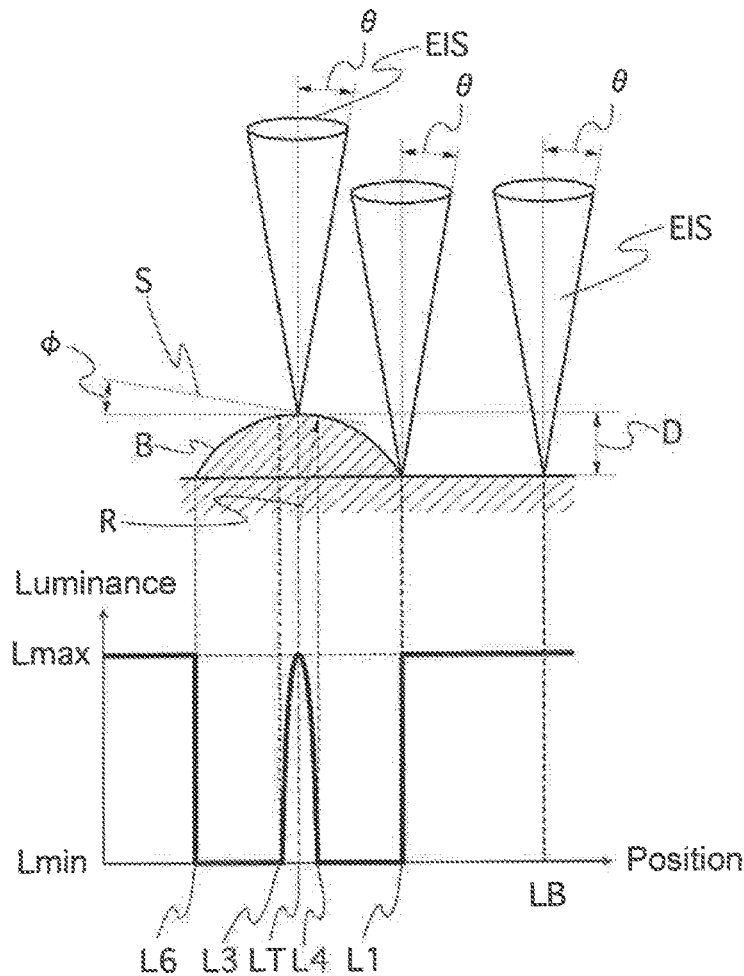
$$\phi = \frac{\theta i + \theta o}{2}$$
$$\theta = \min(\theta i, \theta o)$$
$$r1 = L4 - LT = \frac{L4 - L3}{2}$$
$$r2 = L1 - LT = \frac{L1 - L6}{2}$$
$$R1 = \frac{r1}{\sin\phi}$$
$$R2 = r2$$
$$R3 = \frac{r3 \cos\theta}{\sin\theta - \cos\theta + 1}$$
$$R1 > R2, \ R3 = 0$$
$$R = R1$$
$$D = R - (R^2 - r2^2)^{\frac{1}{2}}$$
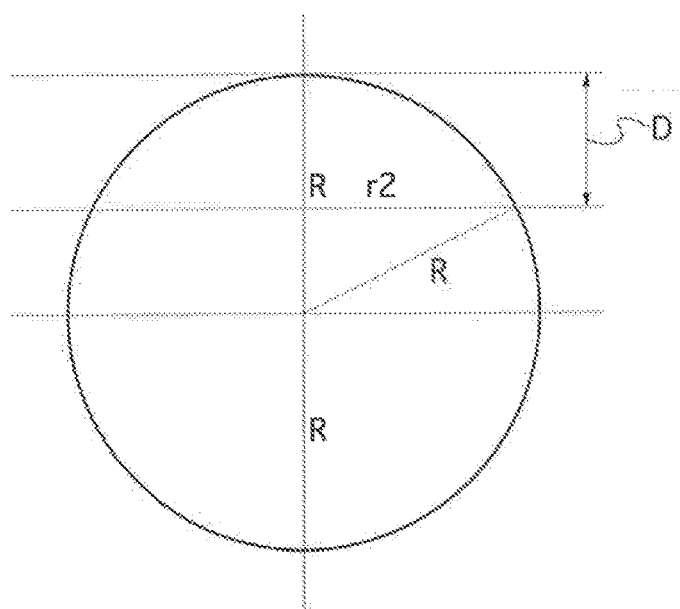

FIG. 19

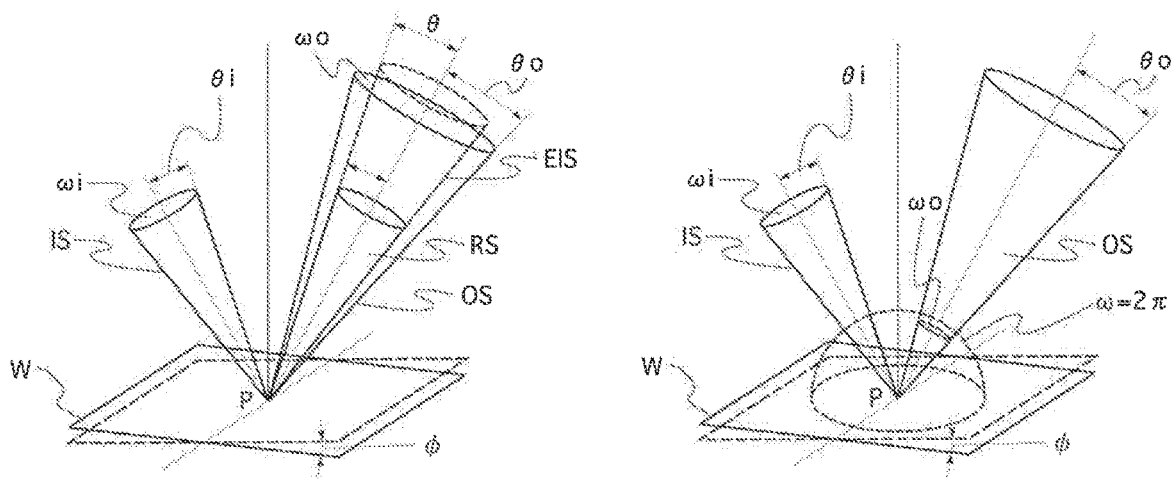

Effective half plane angle: θ = min(θi, θo)
(a) When object light is direct light Solid angle of scattered light: ω = 2π
(b) When object light is scattered light \* When object light is direct light, brightness of point P depends on inclusive relation between solid angle RS of direct light and observation solid angle OS assuming that reflectance is 1, and maximum brightness of point P depends on effective irradiation solid angle EIS that has effective half plane angle θ that is the smaller one of half plane angles of irradiation solid angle ωi and observation solid angle ωo, while when object light is scattered light, since light applied to point P with irradiation solid angle ωi is converted to substantially homogeneous scattered light with solid angle of 2π, which is in turn detected using observation solid angle ωo, brightness thereof is determined by value obtained by dividing product of ωi and ωo by 2π, and therefore, ratio between maximum brightness of scattered light detected using observation solid angle and maximum brightness of direct light detected using observation solid angle is a value that is obtained by dividing the larger one of irradiation solid angle ωi and observation solid angle ωo by 2π relative to 1.

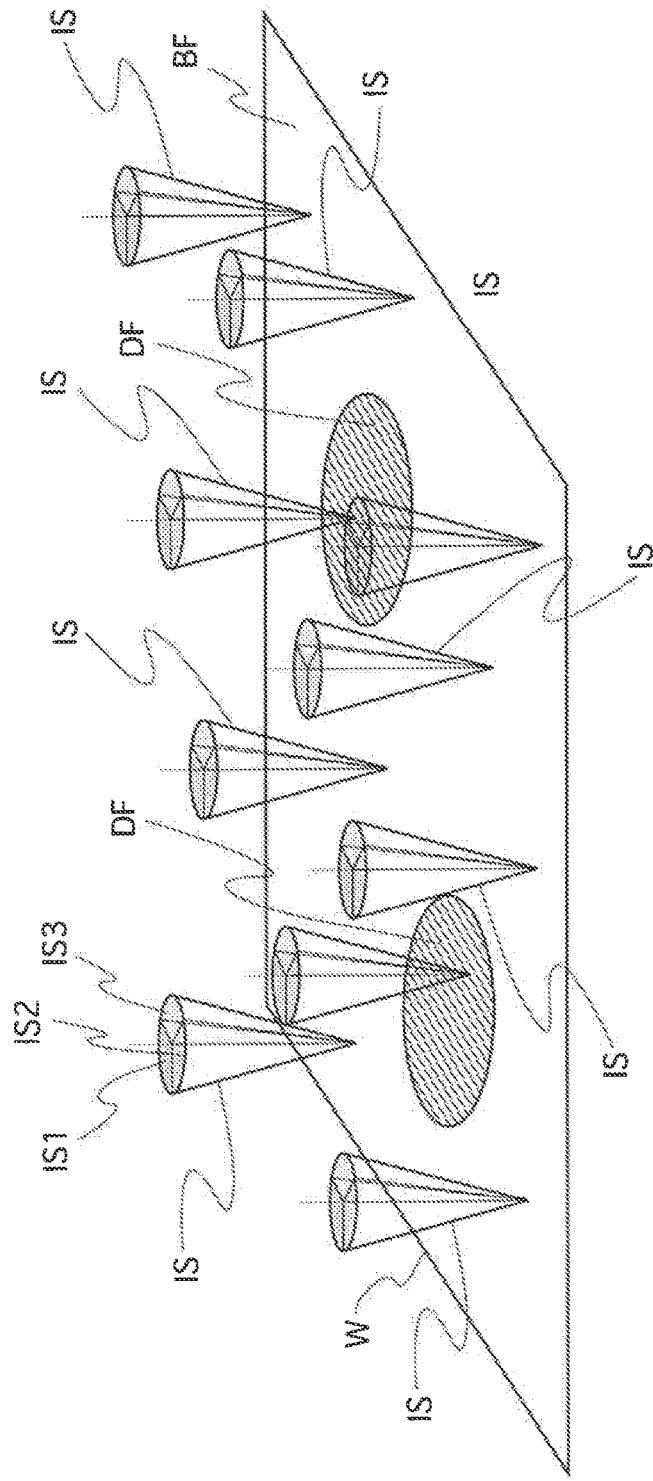

FIG. 20

* If respective points in observation area on inspection surface W are irradiated with light having identical irradiation solid angles IS in each of which solid angle regions IS1, IS2, and IS3 with different optical attributes are radially arranged, observation area is divided into bright-field region BF that returns direct light and dark-field region DF that returns scattered light, by setting threshold for luminance value or by using polarization state of object light returned, and three-dimensional shape is inspected and measured based on variation in brightness for each of the different optical attributes at respective points in each of divided regions, and, in this manner, it is possible to perform continuous inspection and measurement of three-dimensional shape of inspection surface whose three-dimensional shape cannot be continuously inspected and measured by observing only direct light or only scattered light.

INSPECTION AND MEASUREMENT SYSTEM, AND INSPECTION AND MEASUREMENT METHOD

TECHNICAL FIELD

The present invention relates to an inspection and measurement lighting device for use in inspecting an appearance, a flaw, a defect, and the like of a product and measuring a surface profile thereof by, for example, irradiating a product, which is an inspection object, with inspection light. The invention relates also to an inspection and measurement system and an inspection and measurement method.

BACKGROUND ART

An example of an inspection and measurement lighting device for use in appearance inspection, surface profile measurement, and the like of a product is a lighting device, such as those disclosed in Patent Documents 1, 2, and 3, which is capable of irradiating an inspection object with light while performing control to render the shapes and angles of irradiation solid angles of the light incident on the inspection object, and solid angle regions having different optical attributes in the irradiation solid angles, substantially uniform.

With use of an inspection lighting device such as that described above, a feature point such as a defect that is difficult to detect with ordinary irradiation light can be detected by using a captured image. However, there are cases where the shape of the feature point needs to be measured more quantitatively using information contained in the image.

More specifically, in the case where object light returned from an object surface to be inspected has a low content of a direct light component that corresponds to regular reflection and regular transmission of irradiation light, and contrast information thereof is therefore acquired by mainly observing a scattered light component, if irradiation conditions, such as inclines of optical axes of irradiation light, at respective points on the object surface cannot be kept uniform, it is difficult to quantitatively reflect incline directions and incline angles of minute areas in the vicinity of respective points on the object surface in a variation in optical attributes, and in the contrast, of the scattered light.

On the other hand, in the case where object light returned from an object surface to be inspected has a high content of the direct light component, and contrast information thereof is acquired by mainly observing the direct light component, when surface characteristics of the object surface include, for example, a three-dimensional shape containing a relatively large change, if an incline of a minute surface constituting the object surface is larger than or equal to a certain angle, the optical axis of direct light that is regular reflection of irradiation light, of object light returned from the object surface, is significantly inclined and thus located outside an observation solid angle formed by an observation optical system from above the object, and therefore, the observation optical system cannot capture direct light from that inclined surface, which means that gray level information of that portion cannot be obtained from the direct light returned from the object, and it is difficult to continuously and quantitatively obtain the surface profile of the object surface.

To deal with the above-described cases, the following methods can be adopted, for example. Irradiation light is applied from a plurality of different directions to produce a variation in illuminance on an inclined minute surface, and the incline angle of that inclined surface can be determined based on the thus obtained contrast information. Alternatively, via data on other regions in which the surface profile of the object surface can be continuously obtained, if it can reach a region adjacent to a discontinuous region in which the surface profile of the object surface cannot be continuously obtained, the three-dimensional shape can be quantitatively obtained with respect to the regions in which the surface profile can be continuously obtained, except for the discontinuous region.

However, with these methods, the following problems arise. In the case where the scattered light component of object light, rather than the direct light component corresponding to regular reflection or regular transmission of irradiation light, is mainly observed, if irradiation light from each of the plurality of directions is not parallel light, or irradiation angles at respective points on the object surface vary depending on the location, illuminance varies even on minute surfaces having the same incline direction and the same incline angle, of the object surface, and thus there are cases where it is difficult to quantitatively obtain incline information of those minute surfaces. On the other hand, in the case where the direct light component of object light, which corresponds to regular reflection or regular transmission of irradiation light, is mainly observed, with respect to a region in which the surface profile of the object surface can be continuously obtained as contrast information of the object surface, it is possible to acquire a quantitative three-dimensional shape thereof however, with respect to a region that is isolated by a discontinuous region or a region that is surrounded by a discontinuous region, there are cases where it is difficult to obtain relative information, such as height information, between the three-dimensional shape of such a portion and the three-dimensional shape of other portions. Therefore, it is difficult to quantitatively capture the three-dimensional shape of an object as a whole.

CITATION LIST

Patent Documents

Patent Document 1: Japanese Patent No. 5866573
Patent Document 2: Japanese Patent No. 5866586
Patent Document 3: Japanese Patent No. 6451821

SUMMARY OF INVENTION

Problem to be Solved by the Invention

The present invention was made in view of the above-described problems, and it is an object thereof to provide an inspection and measurement system and an inspection and measurement method with which, in an observation area of an object to be inspected, an object surface is irradiated with irradiation light capable of forming identical irradiation solid angles at respective points on the object surface, and when mainly observing a scattered light component, of object light returned from the object surface, other than direct light corresponding to regular reflection or regular transmission of the irradiation light, and acquiring a surface profile of the object surface based on the thus obtained contrast information, inclines of minute surfaces in the vicinity of the respective points on the object surface can be quantitatively reflected as a variation in optical attributes, and in the contrast information, of the scattered light component, or when mainly obtaining contrast information generated by a variation in inclusive relations between solid angles formed by the direct light and observation solid angles formed by an observation optical system for observing the direct light, and thereby acquiring a surface profile of the object surface, a relative relation of three-dimensional shape information such as height, incline, and incline direction, for example, can be acquired with regard to a surface profile of a region that is adjacent to a region in which an incline of a minute surface in the vicinity of a respective point on the object surface is larger than or equal to ½ of the sum of half plane angles of the irradiation solid angle and the observation solid angle at that point, and the observation optical system cannot continuously obtain gray level information based on the direct light returned from the object surface.

Means to Solve the Problems

That is to say, the present invention was made based on the following new idea:

when observing scattered light of object light returned from the inspection object when irradiated with irradiation light, irradiation solid angles of the irradiation light are formed such that the three-dimensional shape of an object surface can be acquired by causing illuminance on minute surfaces in the vicinity of respective points on the object surface to have the same illuminance distribution if the minute surfaces have the same incline direction and the same incline angle and by quantitatively varying optical attributes and contrast of the scattered light component of object light returned from minute surfaces having different incline directions and incline angles, according to the variation in incline direction and incline angle of the minute surfaces, or when observing direct light of object light returned from the inspection object, with attention being paid to the fact that, with respect to a discontinuous region in which the 3D shape of the object surface contains a large change and inclines of minute surfaces in the vicinity of respective points on the object surface cannot be continuously acquired as contrast information of object light returned from the respective points, there is a specific region in which irradiation solid angles of the irradiation light incident on respective points on the object surface in the vicinity of the discontinuous region are not reflected in solid angles of direct light corresponding to regularly reflected light of object light returned from those points, and with attention being also paid to a variation in the solid angles of the direct light relative to the irradiation solid angles and a variation in object light from the discontinuous region, the three-dimensional shape of the discontinuous region can be acquired based on contrast information of the object light.

More specifically, an inspection and measurement lighting device of the present invention is an inspection and measurement lighting device configured to irradiate an inspection object with inspection light and to be applied to an inspection and measurement system constituted by the inspection and measurement lighting device and an imaging device configured to image light reflected, transmitted, or scattered by the inspection object, that is, object light returned from an object, the inspection and measurement lighting device including, for example:

a surface light source for emitting inspection light;

a lens disposed between the surface light source and the inspection object and configured to form, on the inspection object, an irradiation solid angle of light that is emitted from the surface light source as the inspection light with which the inspection object is irradiated; and at least one of a first shielding mask configured to form irradiation solid angles of the inspection light applied to respective points on the inspection object by shielding light and a first filtering means configured to divide the inspection light into a plurality of solid angle regions having partially different optical attributes by producing light having different wavelength bands, light having different polarization planes, or light having different quantities of light, or an irradiation solid angle forming means including both the first shielding mask and the first filtering means.

The inspection and measurement lighting device has the following features: with respect to observation solid angles that are formed at respective points on the inspection object by the imaging device when imaging light from the inspection object, the shapes, sizes, or inclines of the irradiation solid angles can be appropriately set such that a desired variation in the contrast at the respective points can be obtained; or in the case where the inside of each irradiation solid angle is constituted by solid angle regions having different optical attributes, the optical attributes and shapes of the solid angle regions and, for example, the division into such regions within the irradiation solid angle can be appropriately set such that the solid angle regions having different optical attributes within the irradiation solid angle can be obtained as combined information of variations in object light for each of the different optical attributes, the object light being returned from the object based on irradiation light applied from the respective solid angle regions and having the respective different optical attributes.

In the case where the object light is direct light corresponding to regular reflection or regular transmission of the irradiation light, based on an inclusive relation between a solid angle, or solid angle regions having different optical attributes, of the direct light that is/are formed reflecting a corresponding irradiation solid angle and a corresponding observation solid angle, or in the case where object light is scattered light other than direct light corresponding to regular reflection or regular transmission of the irradiation light, based on a variation in illuminance in the vicinity of respective points produced by irradiation with light having the irradiation solid angles, or a variation in illuminance with respect to light having different optical attributes, a variation in only one of, or variations in both of, a direct light component corresponding to regular reflection or regular transmission of irradiation light and a scattered light component other than the direct light component, of object light returned from the object are acquired.

Thus, even in a region in which direct light is not returned from the inspection object, or in the vicinity of the discontinuous region in which direct light is not continuously returned, the three-dimensional shape of the discontinuous region can be acquired based on contrast information of the object light obtained as described above. The present invention provides such an inspection and measurement system and such an inspection and measurement method.

The inspection and measurement lighting device may also be a lighting device further including at least one of a second shielding mask and a fourth filtering means, the fourth filtering means transmitting only light having a specific attribute, at a position between the first shielding mask and the surface light source and in the vicinity of a position at which the at least one of the second shielding mask and the fourth filtering means is imaged onto the inspection object by the lens, wherein an irradiation region or an irradiation pattern of the inspection light on the inspection object can be generated as desired by using the second shielding mask or the fourth filtering means.

In the inspection and measurement system and the inspection and measurement system that are described above, for example, with the above-described inspection lighting device, the following effects can be achieved. It is possible to form substantially uniform irradiation solid angles of inspection light applied to respective points on the inspection object by using the lens and the first shielding mask or the first filtering means; or it is possible to irradiate only a necessary portion of the inspection object with the inspection light by radially forming the solid angle regions having different optical attributes, such as different wavelength bands, polarization planes, or quantities of light, in each of the substantially uniform irradiation solid angles, and then applying the lens and the second shielding mask or the fourth filtering means. In the case where object light returned from the inspection object is scattered light, as a result of illuminance, for each of the solid angle regions having different optical attributes, in the vicinity of respective points on the inspection object varying according to the incline direction and the incline angle in the vicinity of the respective points, the contrast for each optical attribute captured using the observation solid angles can be quantitatively varied corresponding to the incline direction and the incline angle of minute surfaces in the vicinity of the respective points; or in the case where object light returned from the object is direct light, based on the inclusive relation between each solid angle of the direct light and a corresponding observation solid angle, for each of the solid angle regions having different optical attributes, a variation can be quantitatively generated according to the direction in which and the amount by which the inclusive relation varies.

Furthermore, in the above-mentioned discontinuous region as well, it is possible to capture a variation in solid angle of direct light and a variation in the contrast of object light other than direct light and thereby identify the variations, and thus, in the above-mentioned discontinuous region in which a variation in direct light cannot be continuously obtained, of the surface profile of the inspection object, it is possible to obtain gray level information that is sufficient for extracting a feature point that has a complex three-dimensional shape on the inspection object.

This can be expressed in a different manner as follows. In the case where, for example, an ordinary lighting device having a surface light source or the like is used, the shape and incline of the irradiation solid angle at each point on the inspection object are determined by the relation between that point on the inspection object and the shape of the light source face of the lighting device, and therefore, it is difficult to obtain uniform inspection light. In addition, with the inspection lighting devices disclosed in Patent Documents 1, 2, and 3, even though the shapes and inclines of irradiation solid angles at respective points on the inspection object can be set to be substantially uniform, if, in the case where object light returned from the respective points on the inspection object is direct light, solid angle regions having a plurality of optical attributes that are similarly formed in respective solid angles of direct light do not continuously vary in terms of the inclusive relations with the observation solid angles, a feature point that has a minute and complex three-dimensional shape on the inspection object cannot be extracted. In contrast, the present invention can achieve the following effects by rendering the shapes and inclines of irradiation solid angles at respective points on the inspection object substantially uniform, and furthermore, dividing the inside of each irradiation solid angle into appropriate solid angle regions having different optical attributes, that is, having different wavelength bands, polarization planes, or quantities of light, for example.

In the case where object light returned from the inspection object is direct light, irrespective of the direction in which the solid angle of the direct light varies in terms of the inclusive relation with the observation solid angle, such a variation can be continuously captured as the amount of variation generated by the variation in inclusive relations of the plurality of solid angle regions with the observation solid angle. Also, in the case where object light returned from the inspection object is scattered light, due to an illuminance variation generated in the vicinity of respective points on the inspection object by light applied thereto from the irradiation solid angles, brightness of the scattered light can be varied according to the degree of incline in the vicinity of the respective points, and, in the case where each irradiation solid angle contains the solid angle regions having different optical attributes, due to an illuminance variation for each of the different optical attributes, the direction of incline and the degree of incline in the vicinity of the respective points can be quantitatively captured as a variation in brightness of the scattered light for each of the different optical attributes. In the above-mentioned discontinuous region as well, a variation in solid angle of direct light or a variation in the contrast of scattered light according to the state of the discontinuous region can be captured. Thus, the three-dimensional shape of the inspection object can be quantitatively acquired.

Furthermore, even when the intensity or the direction of reflected light, transmitted light, or scattered light varies slightly due to a minute change or the like on the inspection object, in order that the varying portion can cause a variation in the quantity of light for each of the solid angle regions having different optical attributes and having respective inclusive relations with the inside of the observation solid angle of the imaging device, the shape and angle of the irradiation solid angle of the inspection light applied to each point on the inspection object can be appropriately set in relation to the size, shape, and angle of the observation solid angle of the imaging device and thus can be appropriately set in accordance with the surface characteristics of the inspection object surface, using the first shielding mask or the first filtering means.

In addition, in the case where object light returned from the inspection object is scattered light, in order to capture how the illuminance on a minute surface from which the scattered light is returned varies for each of the solid angle regions having different optical attributes, the shape and angle of the irradiation solid angle of the inspection light applied to each point on the inspection object can be appropriately set and thus can be appropriately set in accordance with the surface characteristics of the inspection object surface, using the first shielding mask or the first filtering means. Therefore, a minute change or the like can be easily detected, or conversely can be prevented from being detected.

More specifically, in the case where object light returned from respective points on the inspection object is scattered light, by employing an appropriate radial arrangement of solid angle regions having different optical attributes within the irradiation solid angles, it is possible to vary the illuminance corresponding to the solid angle regions having different optical attributes in the vicinity of the respective points according to the incline direction and the incline angle in the vicinity of the respective points. Then, by capturing the variation as the contrast for each of the different optical attributes, it is possible to quantitatively recognize the incline direction and the incline angle in the vicinity of the respective points. Thus, the three-dimensional shape of the surface of the inspection object, which is constituted by a series of such points, can be acquired as image information of a single image at a time by the imaging device.

In order to capture the contrast of object light returned from each point on the inspection object as the contrast for each of the different optical attributes that are set within the irradiation solid angle of the irradiation light, for example, the imaging device can be provided with a second filtering means that is capable of selectively imaging the different optical attributes with respect to object light captured using the observation solid angle. To realize the second filtering means, in the imaging device, for example, a configuration may be adopted in which the light reflected or transmitted from the inspection object is selectively separated for each of the different optical attributes, and then the quantities of light of the respective optical attributes are imaged by an optical sensor, or a configuration may be adopted in which a filter that selectively transmits only light having a specific optical attribute, of the different optical attributes, is provided for each pixel of the optical sensor.

Moreover, when central portions of the irradiation solid angles at respective points on the inspection object are set as dark regions, and only peripheral portions of the irradiation solid angle are set as bright regions, the solid angle regions having different optical attributes in the bright regions become smaller relative to regions in the vicinity of respective points on the inspection object, and therefore, an illuminance variation according to the incline angle of the regions in the vicinity of the respective points can be made more marked. Thus, in the case where object light returned from the vicinity of the respective points is scattered light, the levels of contrast of the scattered light that correspond to the respective solid angle regions having different optical attributes in the bright regions of the irradiation solid angles are enhanced by the more marked illuminance variation, so that the variation in darkness/brightness according to the incline angle can be captured as an even more significant variation. Therefore, minute inclines in the vicinity of respective points on the inspection object can be more quantitatively detected.

Moreover, in addition to the above configuration, when the peripheral portions of the irradiation solid angles at respective points on the inspection object are each locally and discretely set as bright regions, the solid angle regions having different optical attributes in the bright regions become smaller relative to the incline direction of regions in the vicinity of the respective points on the inspection object, and therefore, a variation in illuminance according to the incline direction of the regions in the vicinity of the respective points can be made more marked. Thus, in the case where object light returned from the vicinity of the respective points is scattered light, the levels of contrast of the scattered light that correspond to the solid angle regions having different optical attributes in the bright regions of the irradiation solid angles are enhanced by the more marked illuminance variation, so that a variation in the contrast due to the incline direction can be captured as an even more significant variation. Therefore, minute inclines in the vicinity of respective points on the inspection object as well as the incline direction thereof can be more reliably detected.

When object light returned from respective points on the inspection object is direct light, and an irradiation solid angle with a half plane angle $\theta i$ of irradiation light applied to each point on the inspection object and an observation solid angle with a half plane angle $\theta o$ at that point on the inspection object are set such that the optical axes of the irradiation solid angle and the observation solid angle coincide with each other or extend in directions of regular reflection relative to each other, a limit incline angle $\Phi e$ in the vicinity of each point on the inspection object at which direct light returned from that point can be observed using the observation solid angle is ½ of the sum of the half plane angle $\theta i$ of the irradiation solid angle of irradiation light applied to that point on the inspection object and the half plane angle $\theta o$ of the observation solid angle at that point on the inspection object. In the case where a differential angle by which an incline angle $\theta s$ that is formed between a surface in the vicinity of each point on the inspection object and a normal line to a planar portion of the inspection object is deviated from 90°, which is the incline angle when that surface is planar, is smaller than $\Phi e$, direct light returned from respective points on the inspection object can be continuously captured using the observation solid angles, and the degrees of the incline angle in the vicinity of the respective points on the inspection object can be captured as the contrast of the direct light according to the inclusive relations between the solid angles of the direct light and the observation solid angles. However, in the case where the differential angle by which the incline angle $\theta s$ is deviated from 90°, which is the incline angle when the surface in the vicinity of each point on the inspection object is planar, is larger than ½ of the sum of the half plane angle $\theta i$ and the half plane angle $\theta o$, in this discontinuous region, the direct light cannot be captured using the observation solid angle, and the three-dimensional shape of the inspection object in the discontinuous region cannot be identified.

In the above-mentioned discontinuous region, in the case where the optical axes of the irradiation solid angle and the observation solid angle coincide with each other, and the incline angle $\theta s$ of a surface in the vicinity of each point on the inspection object is smaller than an effective half plane angle $\theta$ that is represented by the smaller one of the half plane angle $\theta i$ of the irradiation solid angle of irradiation light applied to each point on the inspection object and the half plane angle $\theta o$ of the observation solid angle at that point on the inspection object, assuming that regions located on both sides of the discontinuous region are substantially planar, a value obtained by dividing the width of the discontinuous region that is specified based on a variation in the contrast of direct light captured in the discontinuous region by the tangent of the effective half plane angle $\theta$ is a difference D in height between the continuous regions that are located on both sides of the discontinuous region.

Also, in the case where a sphere with an unknown radius R, which is an example of the discontinuous region, is irradiated with irradiation light having an irradiation solid angle with a half plane angle $\theta i$, the sphere is then observed using an observation optical system having an observation solid angle with a half plane angle $\theta o$, and the optical axes of the irradiation solid angle and the observation solid angle extend in a direction in which the optical axes coincide with each other, the radius R of the sphere can be obtained as a value R1 obtained by dividing the radius r1 of a circular area in which direct light returned from a top portion of the sphere is observed by the tangent of the above-mentioned limit incline angle $\Phi e$.

Also, in the case where the optical axes of the irradiation solid angle and the observation solid angle coincide with each other, and a sphere with an unknown radius R is present on a substantially planar portion of the inspection object, the radius R of the sphere can be obtained as a value R2 of the radius r2 of an area in which no direct light is observed and which is formed outside the circular area of the top portion of the sphere, in which direct light is observed.

In addition, the radius R of the sphere can also be obtained as a value R3 that is obtained by multiplying a width r3 in which a contrast variation of direct light occurs and which is formed around the area in which no direct light is observed and which is formed outside the circular area of the top portion of the sphere, in which direct light is observed, by the cosine of the effective half plane angle $\theta$, and then dividing the thus obtained product by a value that is obtained by subtracting the cosine of the effective half plane angle $\theta$ from the sine of the effective half plane angle $\theta$ and adding 1 to the remainder.

Accordingly, in the case where the optical axes of the irradiation solid angle and the observation solid angle coincide with each other, and a sphere with an unknown radius R is present touching a substantially planar portion of the inspection object, the height D of the top portion of the sphere relative to the substantially planar portion can be obtained as a value that is double any one of the following values: R1, which is obtained from the radius r1 of a circular area in which direct light returned from the top portion of the sphere is observed; R2, which is the radius of an area in which no direct light is observed and which is formed outside the circular area of the top portion of the sphere; and R3, which is obtained from the width r3 in which a contrast variation of direct light occurs and which is formed around the area in which no direct light is observed and which is formed outside the circular area of the top portion of the sphere.

At this time, the values of R1, R2, and R3 are all the same, but if the three values are not the same, this means that the sphere is not a perfect sphere. In general, the value of R1 corresponds to the height from the center of the sphere to the top portion of the sphere, the value of R2 corresponds to the horizontal radius of the sphere from the center of the sphere, and the value of R3 corresponds to the height from the center of the sphere to the surface of the sphere that touches the substantially planar portion of the inspection object. Therefore, from these three values, it is possible to obtain the position of the sphere relative to the substantially planar portion of the inspection object, and an approximate shape of the sphere.

Moreover, in the case where the optical axes of the irradiation solid angle and the observation solid angle coincide with each other, and a sphere with a radius R is present on a substantially planar portion of the inspection object, with the value of the height D of the top portion of the sphere relative to the substantially planar portion being greater than double the radius R of the sphere, the values of R1 and R2 are equal to each other, but the value of R3 is observed to be greater than the values of R1 and R2, and the height D can be obtained as a value that is obtained by adding, to the value of R1, or to the value of R2, a value that is obtained by subtracting a correction term $\Delta L$ from the value of r3 and dividing the remainder by the tangent of the effective half plane angle $\theta$, where the correction term $\Delta L$ is a value that is obtained by multiplying the radius R of the sphere by the reciprocal of the cosine of the effective half plane angle $\theta$ and also by a value that is obtained by subtracting the cosine of the effective half plane angle $\theta$ from 1.

Moreover, in the case where the optical axes of the irradiation solid angle and the observation solid angle coincide with each other, and a sphere with a radius R is present on a substantially planar portion of the inspection object, with the value of the height D of the top portion of the sphere relative to the substantially planar portion being smaller than double the radius R of the sphere and greater than or equal to the radius R of the sphere, the values of R1 and R2 are equal to each other, the value of R3 is observed to be smaller than the values of R1 and R2, and the height D can be obtained as a value that is obtained by adding, to the value of R1, or to the value of R2, a value that is obtained by subtracting the correction term $\Delta L$ from the value of r3 and dividing the remainder by the tangent of the effective half plane angle $\theta$.

Moreover, in the case where the optical axes of an irradiation solid angle and an observation solid angle coincide with each other, and a sphere with a radius R is present on a substantially planar portion of the inspection object, with the value of the height D of the top portion of the sphere relative to the substantially planar portion being smaller than the radius R of the sphere, the value of R1 is greater than the value of R2, and the value of R3 is observed to be a value that is not zero, the height D can be obtained as a value that is obtained by adding, to the value of R1, a value obtained by dividing the correction term $\Delta L$ by the tangent of the effective half plane angle $\theta$.

Moreover, in the case where the optical axes of an irradiation solid angle and an observation solid angle coincide with each other, and a sphere with a radius R is present on a substantially planar portion of the inspection object, with the value of the height D of the top portion of the sphere relative to the substantially planar portion being smaller than the radius R of the sphere, the value of R1 is greater than the value of R2, and the value of R3 is observed to be approximately zero, the height D can be obtained as a value that is obtained by subtracting the square of the value of r2 from the square of the value of R1 and then subtracting the square root of the remainder from the value of R1.

With regard to irradiation solid angles of the inspection light applied to the discontinuous region of the inspection object, when each irradiation solid angle is divided into a plurality of solid angle regions having partially different optical attributes by producing light having different wavelength bands, light having different polarization planes, or light having different quantities of light, and the solid angle regions are radially arranged around the optical axis of the irradiation solid angle, in the three-dimensional shape of the discontinuous region, it is possible to acquire different variations in shape, in terms of the incline direction and the incline angle of the surface the discontinuous region, in all directions.

The present invention can achieve the following effects. In the case where an inspection object is irradiated with inspection light having substantially uniform irradiation solid angles at respective points on the inspection object, with regard to a variation in solid angles of direct light that occurs when the reflection direction or the transmission direction of the inspection light varies due to a defect or the like, it is possible to selectively capture only the variation in the solid angles of direct light by adjusting the relative relation between the irradiation solid angles of the inspection light and the observation solid angles of the imaging device in terms of their shapes, angles, and sizes such that a variation in quantity of light within the observation solid angles according to the variation in the solid angles is maximized, but a variation in the quantity of light within the observation solid angles due to any other variations is minimized. Moreover, with regard to scattered light whose brightness varies due to a defect or the like, it is possible to accurately capture a desired variation in brightness of scattered light by adjusting the relative relation between the irradiation solid angles of the inspection light and inclines in the vicinity of the respective points on the inspection object and thereby appropriately set an illuminance variation in the vicinity of the respective points.

Moreover, if any desired solid angle regions having different optical attributes are further set appropriately within each irradiation solid angle, variations in the quantity of light in the respective solid angle regions can be observed simultaneously, so that, to address variations in light at various feature points having complex three-dimensional structures on the inspection object, variations in light corresponding to variations in each three-dimensional structure in various directions can be continuously captured.

It is extremely difficult for a conventional lighting device, with which the shape, angle, and size of irradiation solid angles of inspection light differ at different points on the inspection object surface, to capture a minute variation in light due to a defect or the like that has a minute and complex three-dimensional structure as described above; even the description of inspection lighting disclosed in Patent Documents 1 and 2 makes no mention of a solid angle structure with which a variation in the inclusive relations between the observation solid angle and a plurality of solid angle regions that are contained in a solid angle of object light and that have different optical attributes can be detected irrespective of the direction in which the inclusive relations vary, and even the description of the inspection system and the inspection method disclosed in Patent Document 3 makes no mention of a method for acquiring the three-dimensional shape of a discontinuous region in which direct light returned from respective points on the inspection light cannot be captured using observation solid angles at the respective points. However, according to the present invention, it is possible to capture the three-dimensional shape of such a discontinuous region in all directions by acquiring a minute variation in light returned from the discontinuous region irrespective of whether the returned light is direct light or scattered light.

In order to control the sizes of irradiation solid angles of inspection light applied to respective points on the inspection object so as to be substantially uniform, and to enable adjustment of the incline distribution of the irradiation solid angles with respect to the center of the optical axes thereof, the first shielding mask and/or the first filtering means, or a third filtering means that integrates the functions of both, can be disposed at a position in front of or behind the focus position of the lens, centered around the focus position. In the following description, the first shielding mask, the first filtering means, and the third filtering means are represented by the first shielding mask. That is to say, irradiation solid angles at respective points on the inspection object can each be set to have a desired shape or size by changing the aperture of the first shielding mask. Also, if the first shielding mask is disposed at the focus position of the lens, all of the optical axes of the irradiation solid angles of the inspection light become parallel to the optical axis of the inspection light; if the first shielding mask is disposed nearer to the lens than the focus position of the lens, the irradiation solid angles of the inspection light can be inclined in a direction in which the inspection light spreads out; and if the first shielding mask is disposed outward of the focus position of the lens, the irradiation solid angles of the inspection light can be inclined in a direction in which the inspection light is narrowed. As described above, irradiation solid angles of the inspection light that have a direct effect on the solid angles of light reflected or transmitted from the inspection object can be adjusted in various manners by changing the position and the aperture of the first shielding mask, and thus, when observing direct light returned from the inspection object, the relation between solid angles of the direct light and observation solid angles of the imaging device can be made suited for obtaining desired contrast information, while when observing scattered light returned from the inspection object, the relation between irradiation solid angles and inclines of surfaces in the vicinity of respective points on the inspection object can be made suited for obtaining desired contrast information. The reason is as follows: in the above-described manner, a variation in the inclusive relation between each solid angle of direct light and a corresponding observation solid angle of the imaging device, which determines brightness of direct light returned from the inspection object, can be optimized, or a variation in illuminance in the vicinity of respective points on the inspection object, which determines brightness of scattered light returned from the inspection object, can be optimized; and even in the case where the observation optical system that is used is not a telecentric optical system but an optical system in which the incline of the optical axes of its observation solid angles varies between an outer side of a field-of-view range and the optical axis center, or even in the case where the inspection object has a curved surface, the relations between irradiation solid angles at respective points on the inspection object and observation solid angles or the relations of optical axes of irradiation solid angles with the vicinity of respective points on the curved surface can be kept substantially uniform, and thus, it is possible to more accurately capture a minute change or a complex change.

Furthermore, the above-mentioned any desired solid angle regions that have different optical attributes and that are set within each irradiation solid angle can further be set as any desired solid angle regions within each of the irradiation solid angles that are set to be uniform on the inspection object. Thus, not only the brightness at each point on the inspection object is determined simply by the relation between the irradiation solid angle and the observation solid angle, or the relation between the irradiation solid angle and the normal line to the surface in the vicinity of that point on the inspection object, but also an even more minute variation in object light in the individual solid angle regions can be quantitatively and simultaneously observed, under substantially the same conditions at all points in the field-of-view range on the inspection object, as brightness of the respective points based on a variation in the relation with the observation solid angle, or a variation in illuminance depending on the relation with the normal line to the surface in the vicinity of each point on the inspection object, without the need to separately reset the relation between the irradiation solid angle and the observation solid angle in terms of their shapes, optical axes, and the like, or the relation between the irradiation solid angle and the normal line to the surface in the vicinity of each point on the inspection object.

The reason why the inspection and measurement system that employs at least one of the inspection and measurement lighting device and the inspection and measurement method according to the present invention and that also includes an imaging device for imaging light reflected or transmitted, or scattered, by an inspection object is capable of, as described above, continuously obtaining desired contrast information with respect to a feature point having a minute and complex three-dimensional shape irrespective of the direction in which the three-dimensional shape is inclined is as follows. Since the contrast at each point on the inspection object is determined by the quantity of light of direct light or scattered light from that point on the inspection object toward the imaging device, and, because irradiation solid angles at respective points on the inspection object are all uniform, this quantity of light is determined by the inclusive relation between the direct light from that point on the inspection object and the observation solid angle of the imaging device, or the angle formed by the irradiation solid angle and the normal line to a surface in the vicinity of that point, the inspection and measurement system is provided with the function of adjusting irradiation solid angles of the inspection light, which have a direct effect on light reflected or transmitted from respective points on the inspection object, so as to be substantially uniform.

Furthermore, with the configuration in which the inside of each irradiation solid angle is divided into any desired solid angle regions having different optical attributes, that is, different wavelength bands, polarization planes, or quantities of light, and those solid angle regions are radially arranged around the optical axis of the irradiation solid angle, the imaging device can selectively observe the quantity of light for each divided region, and furthermore, irrespective of the direction in which the optical axis of object light returned from each point on the inspection object is inclined relative to the optical axis of the observation solid angle, the imaging device can capture both the direction of incline and the degree of incline as a continuous variation in the quantity of light for each of the plurality of divided regions that have different optical attributes.

In order that contrast information regarding the inspection object that is imaged by the imaging device exhibits a substantially uniform variation according to inclines of the surface of the inspection object across the entire imaging area, the inclusive relations between the observation solid angles that are formed at respective points on the inspection object by the imaging device and the solid angles of light reflected or transmitted from the respective points on the inspection object, or the angular relations between the irradiation solid angles of irradiation light applied to respective points on the inspection object and normal lines to surfaces in the vicinity of the respective points, have to be kept substantially uniform according to the degrees of the variation.

This can be realized by moving the first shielding mask and/or the first filtering means, or the third filtering means, to a position in front of or behind the focus position of the lens, centered around the focus position, thereby adjusting the shapes and sizes of irradiation solid angles of the inspection light and solid angle regions formed within the individual irradiation solid angles so as to be substantially uniform, with respect to respective points on the inspection object, and also adjusting their incline angles so as to be included in the inclines of the observation solid angles at the respective points on the inspection object, or to be included in the inclines of normal lines to reference surfaces of the inspection object.

Also, in order to make it possible to generate an irradiation region, an irradiation shape, or an irradiation pattern as desired while keeping substantially uniform relations of irradiation solid angles of the inspection light incident on the inspection object, and solid angle regions that are formed as desired within each irradiation solid angle, with observation solid angles for respective points within the irradiation area, or with normal lines to surfaces in the vicinity of respective points on the inspection object, in addition to at least one of the first shielding mask and the first filtering means, or the third filtering means, at least one of the second shielding mask and the fourth filtering means can be provided and disposed in the vicinity of a position at which the second shielding mask and/or the fourth filtering means is imaged onto the inspection object by the lens.

With this configuration, while keeping substantially uniform shapes, sizes, and inclines of the irradiation solid angles of the inspection light and the solid angle regions that are formed as desired within the irradiation solid angles, it is possible to independently adjust both the irradiation region of the inspection light on the inspection object and the optical attributes of that irradiation region as well as the irradiation solid angles of the inspection light at respective points on the inspection object and the solid angle regions having specific optical attributes.

In order to make it possible to inspect and measure the three-dimensional shape and the like of the inspection object in a more simplified manner, it is sufficient that, in addition to the first shielding mask and the first filtering means, or the third filtering means, the second shielding mask in which a predetermined mask pattern is formed and the fourth filtering means are used, and this pattern is imaged onto the inspection object.

With this configuration, due to substantially uniform irradiation solid angles and solid angle regions having specific optical attributes, which are adjusted using the first shielding mask and the first filtering means, the imaging device can obtain contrast information that exhibits a uniform variation in the contrast, and if there is any problem with the shape of the inspection object, distortion occurs in the pattern that is obtained as the contrast information by the imaging device, so that the defect in shape can be detected in a simplified manner.

The brightness of scattered light at respective points on the inspection object is determined by the illuminance in the vicinity of the respective points and the scattering rate of the respective points. Assuming that the shapes and sizes of irradiation solid angles of light applied to the respective points are fixed, and angles that are formed by the optical axes of the irradiation solid angles and a normal line to a reference surface of the inspection object are all the same, the illuminance in the vicinity of each point is determined in proportion to the cosine of an angle that is formed by a normal line to a surface in the vicinity of that point and the optical axis of the irradiation solid angle. Accordingly, the brightness of scattered light is proportional to the cosine of the incline angle of the surface in the vicinity of each point, and thus, the three-dimensional shape of the inspection object can be detected based on a variation in the brightness of scattered light. However, without any further processing, merely limited contrast information that depends on the shape and size of the irradiation solid angles can be obtained.

To address this issue, a configuration is adopted in which any desired solid angle regions having different wavelength bands or polarization planes or different quantities of light are formed within the irradiation solid angle at each point on the inspection object, and the solid angle regions are radially arranged around the optical axis of the irradiation solid angle. With this configuration, the solid angle regions are reflected in illuminance on a surface in the vicinity of each point on the inspection object as illuminance with respect to light components having different wavelength bands or polarization planes, and therefore, if brightness of scattered light returned from each point is observed as brightness of light components having different wavelength bands or polarization planes, the direction in which and the degree by which the surface in the vicinity of that point is inclined can be detected based on the ratio by brightness of such light components.

To realize the above concept, the following methods can be used. First, the above concept can be realized by providing a half mirror for changing the irradiation direction of the inspection light and transmitting light from the inspection object so that the light can be imaged by the imaging device; appropriately adjusting irradiation solid angles of the inspection light incident on respective points on the inspection object to cause the optical axes of the irradiation solid angles at the respective points on the inspection object to extend in the same direction and to coincide with the optical axes of observation solid angles formed by the imaging device at the respective points on the inspection object; and thereby allowing a variation in the brightness of object light returned from the respective points on the inspection object, the variation being captured using the observation solid angles, to correspond to degrees of incline of surfaces in the vicinity of the respective points on the inspection object irrespective of the direction in which the surfaces are inclined.

Second, the above concept can be also realized by setting observation solid angles of the imaging device in a direction that is line-symmetrical to the irradiation direction of the inspection light, where a normal line to the inspection object is the line of symmetry; and causing the optical axes of solid angles of light reflected or transmitted from respective points on the inspection object to coincide with the optical axes of observation solid angles formed by the imaging device at the respective points on the inspection object, and furthermore, in the case where scattered light is mainly observed, the above concept can be also realized by causing the shapes and sizes of the irradiation solid angles at respective points on the inspection object as well as the inclines of their optical axes to be all the same; and allowing the directions of incline and the degrees of incline of surfaces in the vicinity of the respective points to be reflected in brightness of scattered light returned from the respective points.

Furthermore, if the imaging device includes a second filtering means that enables selective imaging of light in solid angle regions that are reflected in the solid angle of the reflected light or the transmitted light and that have different wavelength bands or polarization planes, or quantities of light, or selective imaging of a variation in illuminance with respect to different wavelength bands or polarization planes, or quantities of light, of the scattered light, a possible contrast variation that may occur based on the inclusive relations of the individual solid angle regions with the observation solid angles with respect to different wavelength bands or polarization planes, or quantities of light, or a possible contrast variation of the scattered light, can be detected simultaneously.

Moreover, a threshold of brightness of object light returned from respective points on the inspection object is set in the imaging device or for image information obtained by the imaging device, an imaging region of the inspection object is divided into a bright region and a dark region based on the threshold, and, for example, with the bright region being regarded as a bright-field region and the dark portion being regarded as a dark-field region, in the bright-field region, a variation in brightness that occurs due to the inclusive relation between solid angle of direct light and observation solid angle being varied according to the angles of incline at respective points is used, while in the dark-field region, a variation in brightness of scattered light corresponding to illuminance that is proportional to the cosine of the angle of incline at each point is used. In this manner, three-dimensional shapes of the respective regions can be detected simultaneously.

Moreover, when a configuration is adopted in which image information acquired by the imaging device can be obtained in a floating-point format, three-dimensional shapes of the bright region and the dark region can be identified through the division into the bright region and the dark region and the application of appropriate arithmetic operations for the respective regions.

Advantageous Effects of Invention

As described above, according to the inspection and measurement lighting device, the inspection and measurement system, and the inspection and measurement method of the present invention, it is possible to freely adjust the sizes and forms of irradiation solid angles of inspection light with which respective points on an inspection object are irradiated and dark regions thereof as well as solid angle regions that are formed in each irradiation solid angle and that have different wavelength bands, polarization planes, or quantities of light. Thus, first, inclusive relations of solid angles of light reflected or transmitted from respective points on the inspection object, and a plurality of solid angle regions that are reflected in each of those solid angles and that have different wavelength bands, polarization planes, or quantities of light, with observation solid angles that are formed at the respective points on the inspection object by the imaging device can be set to be substantially uniform.

Second, with regard to scattered light from respective points on the inspection object, illuminance in the vicinity of the respective points can be varied according to the direction of incline and the degree of incline of surfaces in the vicinity of the respective points, based on relations of the irradiation solid angles, and the plurality of solid angle regions that are formed within each irradiation solid angle and that have different wavelength bands, polarization planes, or quantities of light, with the surfaces in the vicinity of the respective points.

Therefore, even in a discontinuous region which is constituted by a defect or the like with a minute and complex three-dimensional structure that has conventionally been difficult to detect and in which light reflected or transmitted from respective points on the inspection object cannot be captured using observation solid angles at the respective points, if scattered light is returned from the discontinuous region, three-dimensional information of the discontinuous region can be acquired as contrast information of scattered light having different wavelength bands, polarization planes, or quantities of light in which incline information of a surface in the discontinuous region is reflected.

In addition, information regarding a step or a difference in height in the discontinuous region can be acquired as a variation in the contrast of direct light that is returned from respective points in the step portion and that has different wavelength bands, polarization planes, or quantities of light, and it is possible to obtain three-dimensional information even in a discontinuous region in which surface characteristics differ significantly, and incline information of contiguous surfaces cannot be continuously obtained from direct light or scattered light returned from that region.

BRIEF DESCRIPTION OF DRAWINGS

FIG. 4 is a diagram schematically showing an inner structure of the main portion for forming an irradiation solid angle of the inspection and measurement lighting device and the inspection and measurement system, with an inspection object being placed inclined, of the embodiment, and irradiation solid angles formed at respective points on the inspection object.

FIG. 5 shows a configuration example of a first shielding mask and a first filtering means as well as a third filtering means.

FIG. 6 includes diagrams schematically showing an irradiation solid angle; a plurality of solid angle regions with different optical attributes formed within the irradiation solid angle; an inclusive relation between a solid angle of direct light that is returned from an object and in which the irradiation solid angle and the plurality of solid angle regions are reflected and an observation solid angle for observing the direct light; and how the inclusive relation changes when a surface in the vicinity of a point from which the direct light is returned is inclined, according to an embodiment of the present invention.

FIG. 7 includes diagrams schematically showing relations between an irradiation solid angle, a plurality of solid angle regions with different optical attributes formed within the irradiation solid angle, and illuminance on an inspection surface, according to an embodiment of the present invention.

FIG. 8 includes diagrams schematically showing an effective irradiation solid angle having an effective half plane angle when optical axes of an irradiation solid angle and an observation solid angle coincide with each other.

FIG. 13 is a diagram schematically showing a variation in observed luminance of direct light on a neighboring region when the incline angle of a surface of a discontinuous region in which direct light from an inspection object cannot be observed, with respect to the vertical direction is below zero.

FIG. 16 is a diagram schematically showing a correlation between a variation in luminance of object light on a neighboring region and a three-dimensional shape when a portion of a sphere is present touching an inspection object, with the height of that portion from the inspection object being greater than the radius of the sphere.

FIG. 17 is a diagram schematically showing a correlation between a variation in luminance of object light on a neighboring region and a three-dimensional shape when a portion of a sphere is present touching an inspection object, with the height of that portion from the inspection object being equal to the radius of the sphere.

FIG. 18 is a diagram schematically showing a correlation between a variation in luminance of object light on a neighboring region and a three-dimensional shape when a portion of a sphere is present touching an inspection object, with the height of that portion from the inspection object being slightly smaller than the radius of the sphere.

FIG. 19 includes schematic diagrams for describing the difference in luminance between direct light and scattered light of object light returned from an inspection object.

FIG. 20 is a schematic diagram illustrating an inspection and measurement method with which continuous inspection and measurement of a three-dimensional shape can be performed by irradiating an inspection surface having a discontinuous region in which a three-dimensional shape of a surface thereof cannot be continuously inspected and measured using only direct light or scattered light, with light having identical irradiation solid angles, and thereby dividing the inspection surface into a bright-field region that returns direct light and a dark-field region that returns scattered light based on brightness or a polarization state and performing image analysis.

DESCRIPTION OF EMBODIMENTS

Figure 1:
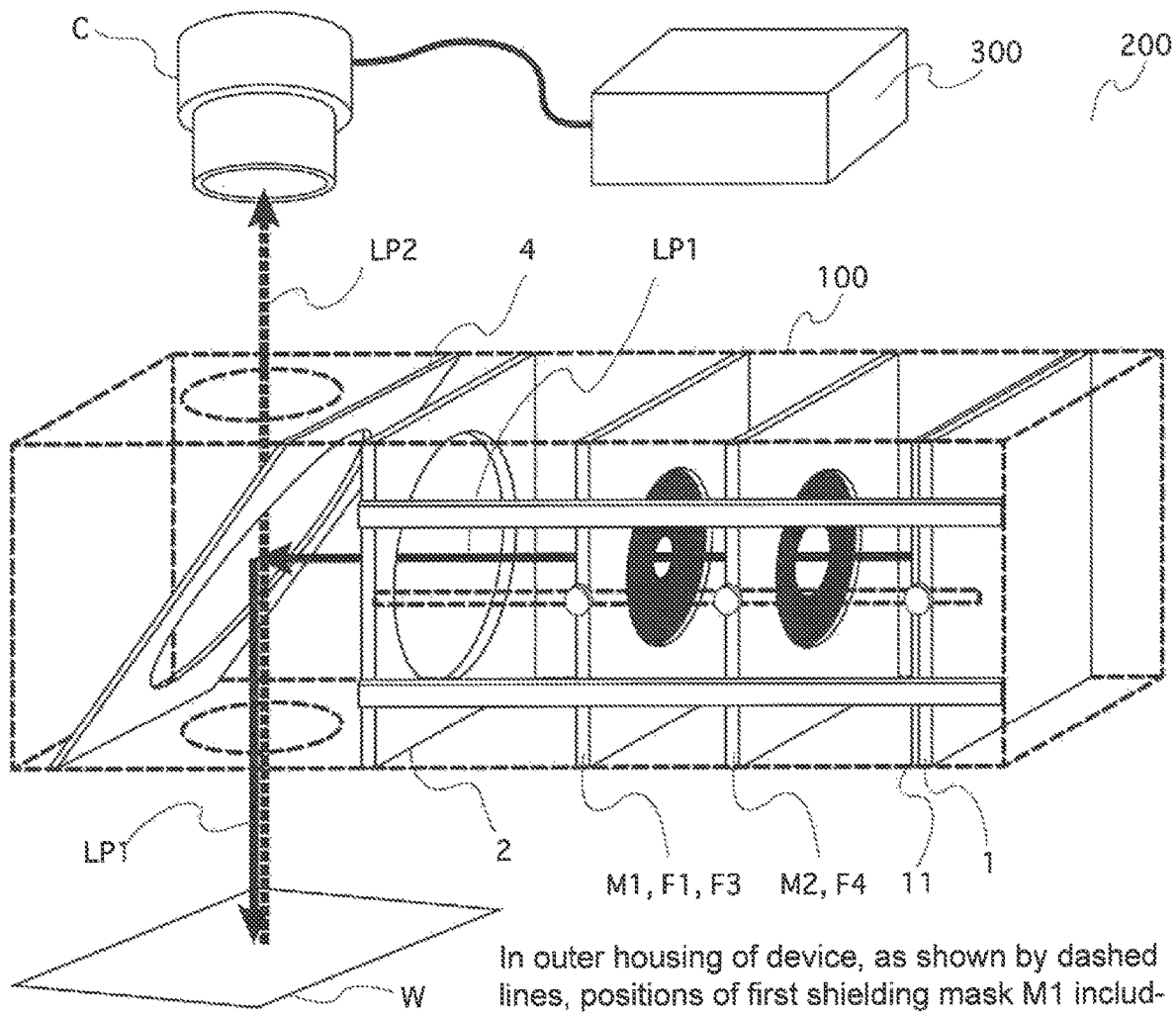
FIG. 1 is a schematic perspective view showing an appearance of an inspection and measurement lighting device and an inspection and measurement system according to an embodiment of the present invention.

A first embodiment of the present invention will be described.

An inspection and measurement system 200 constituted by an inspection and measurement lighting device 100 of the first embodiment, an imaging device C, and an image analyzing means 300 that analyzes an image captured by the imaging device C is configured to provide a so-called coaxial lighting arrangement using a half mirror 4 for providing agreement between an imaging direction of an inspection object W and a lighting direction of the inspection object W, and is used to cause a three-dimensional shape of the inspection object W and a feature point such as a defect thereon to appear as a contrast in an image captured by the imaging device C, to analyze the contrast, and to thereby identify the three-dimensional shape of the inspection object W and the feature point such as a defect thereon.

Moreover, a first filter F1 serves as a means for selectively transmitting light that has a specific attribute and forming a solid angle region composed of the light that has the specific attribute. In terms of the effect of forming a solid angle, the first filter F1 is equivalent to a first shielding mask M1 that forms an irradiation solid angle by shielding or transmitting light. Thus, in FIGS. 1 to 3, the first filter F1 and the first shielding mask M1 as well as a third filtering means F3 that is a single component into which the functions of both the first filter F1 and the first shielding mask M1 are integrated are represented by the first shielding mask M1, and only the reference numerals F1 and F3 are shown along with M1.

Furthermore, in FIG. 1, a fourth filtering means F4 that transmits only light having a specific attribute is represented by a second shielding mask M2, and only the reference numeral F4 is shown along with M2.

Here, the feature point such as a defect on the inspection object W is to be understood to include a broad range of defects and other types of features, such as a flaw on the surface, a dent, a distortion, an external shape, and the presence/absence of a hole.

Figure 2:
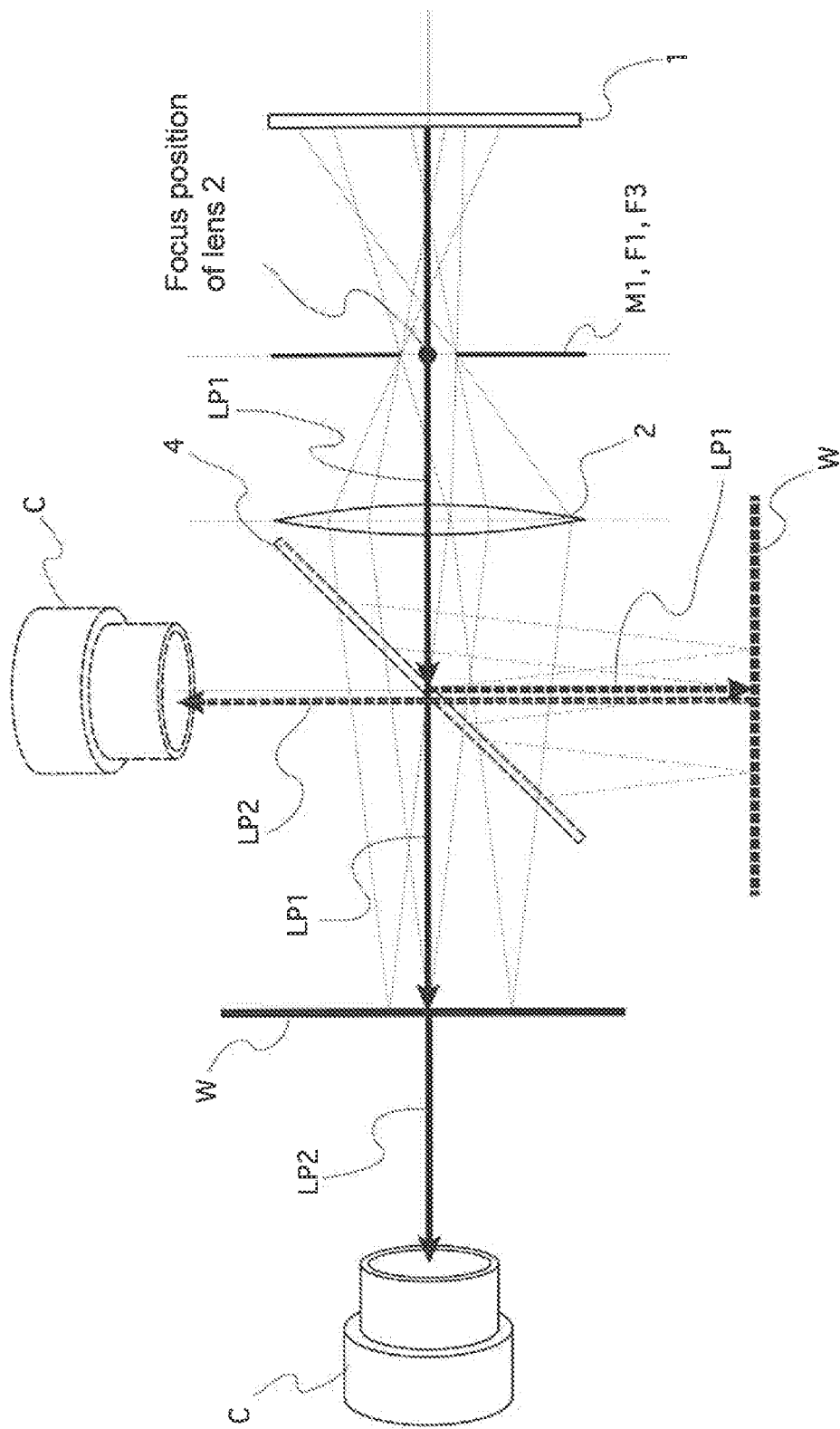
FIG. 2 shows a difference in luminance between direct light and scattered light.

As shown in the perspective view of FIG. 1 and the schematic diagram of FIG. 2, the inspection and measurement lighting device 100 has a substantially tubular housing. Inside this housing and in portions leading to the inspection object W and the imaging device C, there are formed an irradiation light path L1 for irradiating the inspection object W with inspection light from a surface light source 1, and a reflection/transmission light path L2 along which light reflected or transmitted by the inspection object W travels to the imaging device C. In the case where the half mirror 4 is provided, the imaging device C is mounted to a top opening side of the housing, and the inspection object W is placed on a bottom opening side of the housing.

Figure 3:
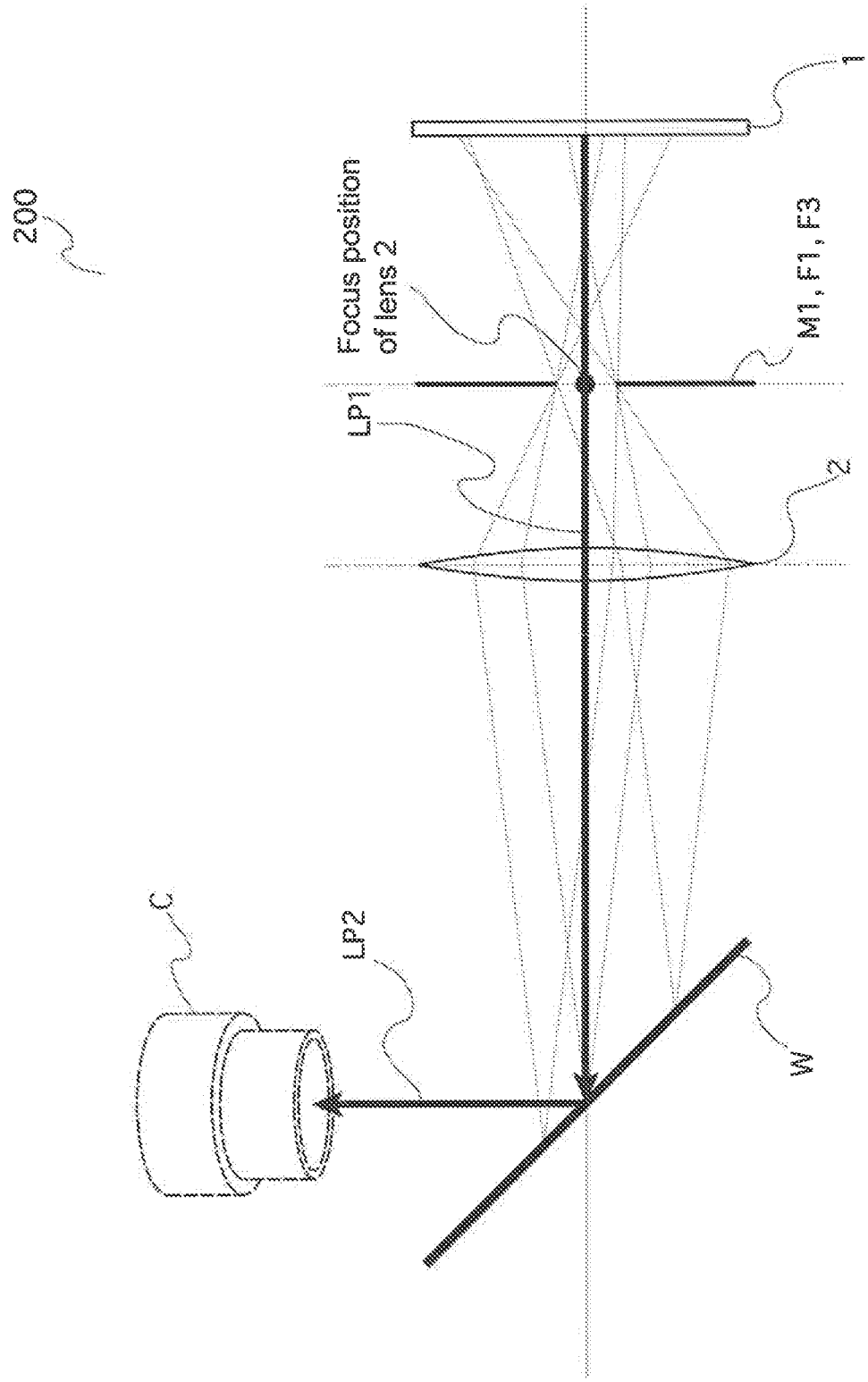
FIG. 3 is a diagram schematically showing an inner structure of a main portion for forming an irradiation solid angle of the inspection and measurement lighting device and the inspection and measurement system of the embodiment, and irradiation solid angles at respective points on an inspection object.

It should be noted that, as shown in FIGS. 1 and 2, in the case where the half mirror 4 is provided, the irradiation light path L1 is constituted by a portion extending from the surface light source 1 to the half mirror 4 and a portion along which the light partially reflected by the half mirror reaches the inspection object. On the other hand, in the case where the half mirror 4 is not provided, the inspection light is directly applied to the inspection object along the irradiation light path L1, and in the example shown in FIG. 2, a light path along which light transmitted by the inspection object W reaches the imaging device C constitutes the light path L2. However, as shown in FIG. 3, object light returned from the inspection object W may also be reflected light or scattered light, and in that case, the imaging device C can be provided at a position where it can observe the object light.

On the irradiation light path L1, in the order of traveling of the inspection light, there are disposed the surface light source 1 for emitting the inspection light, at least one of the first shielding mask M1 and the first filtering means disposed at a position in front of or behind a focus position of a lens 2, centered around the focus position, or instead, the third filtering means F3 having the functions of both the first shielding mask M1 and the first filtering means, and the lens 2 configured to form an irradiation solid angle on the inspection object W from the inspection light emitted from the surface light source 1.

In the case where a half mirror is provided, in addition to the above components, the half mirror 4 is disposed inclined relative to the reflection/transmission light path L2 and the irradiation light path L1 so as to partially reflect the inspection light downwards. Moreover, in the case where a second shielding mask and a fourth filtering means for forming an irradiation region of the inspection light are provided, at least one of the second shielding mask M2 and the fourth filtering means for forming an irradiation region having a specific optical attribute is provided between the surface light source 1 and the first shielding mask and the first filtering means, or between the surface light source 1 and the third filtering means, and in the vicinity of the position at which the second shielding mask M2 and/or the fourth filtering means is imaged onto the inspection object W by the lens 2, and the inspection light is applied to the inspection object W therethrough.

Moreover, in the case where a half mirror is provided, the half mirror 4 is provided on the reflection/transmission light path L2, so that the reflected light partially transmitted by this half mirror 4 is observed by the imaging device C. In the case where no half mirror is provided, in the example shown in FIG. 2, a light path along which light transmitted by the inspection object W travels to reach the imaging device C constitutes the light path L2, or, in the example shown in FIG. 3, a light path along which light reflected or scattered by the inspection object W travels to reach the imaging device C constitutes the light path L2. No other component than the half mirror 4 is present on the light path L2 in FIGS. 1 to 3; however, depending on the circumstances, a mask, an aperture stop, or the like for partially shielding the light reflected or transmitted, or scattered, by the inspection object may also be provided on the light path L2 for the purpose of shutting out stray light from the inspection object.

Next, layouts, arrangements, and functions of the various members will be described in detail.

The surface light source 1 has a light-emitting face 11 that has a substantially uniform diffuser face formed by a chip type LED, a diffusion plate, or the like, for example; however, the surface light source 1 may also be a light source whose light emission mode is controlled so as to achieve substantially uniform irradiation solid angles on the inspection object W.

Moreover, as shown in FIG. 1, the surface light source 1 is mounted in such a manner that it can advance and retract in the direction of the optical axis of the irradiation light inside the tubular housing so as to enable adjustment of an irradiation starting position for the inspection light.

In this manner, independent of control of irradiation solid angles, and the shapes and optical axes of solid angle regions with different optical attributes that are formed as desired in each irradiation solid angle, using the first shielding mask M1 and/or the first filtering means F1, or the third filtering means F3 having the functions of both thereof, and control of the shape and optical axis of the irradiation region using the second shielding mask, which will be described later, the degree of uniformity, the luminance distribution, and the like of the inspection light on the inspection object W can be controlled with respect to the irradiation range of the inspection light that is determined by positional relations among the first shielding mask M1 and/or the first filtering means F1, or the third filtering means F3 having the functions of both thereof, the second shielding mask M2, the lens 2, and the surface light source 1. That is to say, since the irradiation light path differs for different irradiation regions, if, for example, the surface light source 1 is preset with a predetermined luminance distribution, emission light wavelength distribution, polarization characteristics distribution, or the like, such a distribution can be varied or can be uniform for different irradiation regions.

As shown in FIG. 1, the second shielding mask M2 and/or the fourth filtering means is mounted in such a manner as to be able to advance and retract in the direction of the optical axis of the irradiation light inside the tubular housing, so that, in accordance with the distance between the lens 2 and the inspection object, the second shielding mask itself can be adjusted to be in the vicinity of a position at which it is imaged onto the inspection object. With this arrangement, as shown in FIG. 7, the irradiation light from the surface light source 1 can be partially shielded, or only light having a specific attribute can be shielded, and the shape of the aperture of the second shielding mask or the shape of a portion of the fourth filter that transmits only light having a specific attribute is substantially imaged onto the inspection object W. Thus, by changing the shape and size of the aperture of the second shielding mask M2 or the pattern shape of the fourth filtering means, the irradiation area of the inspection light or the irradiation region to be irradiated with light having a specific attribute, on the inspection object W, can be set as desired. Moreover, this adjustment or setting can be carried out independently of the control of the irradiation solid angles using the first shielding mask M1 and/or the first filtering means F1, or the third filtering means F3 having the functions of both thereof, which will be described later.

The first shielding mask M1 and/or the first filtering means F1, or the third filtering means F3, which has the functions of both thereof, is disposed at a position between the lens 2 and the surface light source and in front of or behind the focus position of the lens 2, centered around the focus position, and is mounted in such a manner as to be able to advance and retract in the direction of the optical axis of the irradiation light inside the tubular housing as shown in FIG. 1. Here, taking the first shielding mask M1 as a representative example of the first shielding mask M1 and the first filtering means F1 as well as the third filtering means F3, which has the functions of both thereof, if the first shielding mask M1 is disposed at the focus position of the lens 2, for example, all irradiation solid angles IS at respective points on the inspection object W have the same size, shape, and incline angle as shown in FIG. 2. The same holds true for the case where the points on the inspection object are at different distances from the lens 2 as shown in FIG. 3. Moreover, the same holds true irrespective of whether the half mirror 4 is provided and irrespective of the distance between the inspection object W and the lens 2. The foregoing description that has been given taking the first shielding mask M1 as a representative example also applies to the solid angle regions that are formed by the first filtering means F1 or the third filtering means F3, which has the functions of both the first shielding mask M1 and the first filtering means F1.

With regard to the first shielding mask M1, the first filtering means F1, and the third filtering means F3, as shown in FIG. 4, for example, a shielding portion M1 that substantially shields light forms an aperture having any desired shape. Although an example in which a peripheral portion constitutes the shielding portion and a central portion constitutes the aperture is shown in FIG. 4, a portion of the aperture may further constitute a shielding portion. Moreover, the shielding portion may also be a portion that shields only light having a specific attribute. Furthermore, in FIG. 4, the first filtering means F1 is set within the aperture of the shielding portion M1, and here, three types of patterns F11, F12, and F13 for forming respective solid angle regions with different optical attributes are set therein. Although the patterns shown here are radial patterns around the optical axis, the patterns may also be optimized to any pattern appropriate for a feature point of interest on the inspection object. A single component into which the first shielding mask M1 and the first filtering means F1 are integrated corresponds to the third filtering means F3.

With use of the first shielding mask M1 and/or the first filtering means F1, or the third filtering means F3, which are shown in FIG. 4, an irradiation solid angle IS can be formed at each point P on the inspection object W as shown in FIG. 5, for example. The outermost shape of the irradiation solid angle IS is determined by the aperture at the central portion of the first shielding mask M1. Furthermore, within this irradiation solid angle, solid angle regions IS1, IS2, and IS3 having different optical attributes are formed by the first filtering means F1, the solid angle regions IS1, IS2, and IS3 corresponding to the mask patterns F11, F12, and F13, respectively, of the first filtering means F1.

In contrast to the above-described inspection lighting arrangement of the present invention that is capable of forming substantially uniform irradiation solid angles, in the case of a conventional lighting arrangement that uses only an ordinary light source surface, irradiation solid angles IS of the inspection light formed at respective points on the inspection object W have different shapes, sizes, and inclines at the different points on the inspection object W. This is because the irradiation solid angle IS at each point on the inspection object W is uniquely determined by the projection shape, size, and angle of the surface light source 1 when viewed from that point in the opposite direction to the lighting direction.

On the other hand, an observation solid angle OS at each point on the inspection object is determined by the pupil position, the pupil shape, and the pupil size of the imaging device C and a relative relation with that point on the inspection object.

Here, the brightness of each point that is sensed by the imaging device C is determined by an inclusive relation between a solid angle RS of reflected light or a solid angle TS of transmitted light, the solid angles RS and TS directly reflecting the irradiation solid angle IS at that point, and the observation solid angle OS.

Here, in the case where direct light other than scattered light, of object light returned from the inspection object W is mainly observed, the inclusive relation between the irradiation solid angle and the observation solid angle as well as contrast information obtained by the imaging device will be described using FIG. 5.

In FIG. 5, attention is paid to a point P on the inspection object W, and assuming that the point P is irradiated with inspection light having an irradiation solid angle IS, how the brightness of the point P changes when a surface of the inspection object that contains the point P is partially inclined by $\varphi$ is shown. More specifically, how the inclusive relation between each solid angle region and the observation solid angle OS changes when the solid angle RS of reflected light from the point P changes to a solid angle RS' relative to the observation solid angle OS formed at the point P by the imaging device C is shown.

In FIG. 5, the shapes and sizes of the solid angle RS of reflected light from the point P and solid angles RS1 to RS3 within the solid angle RS are equal to those of the irradiation solid angle IS of the inspection light incident on the point P and solid angle regions IS1 to IS3 within the irradiation solid angle IS. The same holds true for the solid angle RS'.

Also, with regard to the inclines of the solid angles RS and RS' of the reflected light, the solid angles RS and RS' are each inclined from a normal line that is perpendicular to the inspection surface and that passes through the point P by an angle equal to the incline $\theta$ of the irradiation solid angle IS of the inspection light in a direction in which the solid angle RS, RS' and the irradiation solid angle IS of the inspection light are line symmetrical with respect to the normal line.

Accordingly, in FIG. 5(a) in which the inspection surface containing the point P is planar and is not inclined, the optical axis of the observation solid angle OS that is formed at the point P by the imaging device C and the optical axis of the solid angle RS of the reflected light coincide with each other, and the brightness at the point P that is to be sensed by the imaging device C is determined by inclusive relations between the observation solid angle OS and the solid angle RS of the reflected light and between the observation solid angle OS and the solid angle regions RS1 to RS3 within the solid angle RS, as brightness for each of the different optical attributes corresponding to the respective solid angle regions.

Next, in FIG. 5(b), a case where the surface of the inspection object W that contains the point P is partially inclined by φ is considered. In this case, the solid angle RS of reflected light from the point P will be inclined by 2φ like the solid angle RS' indicated by the dotted lines in the diagram.

At this time, if the solid angle RS' of reflected light from the point P does not have an inclusive relation with the observation solid angle OS that is formed at the point P by the imaging device C, the brightness of the point P when seen from the imaging device C is zero. However, if the solid angle RS' has a partial inclusive relation with the observation solid angle OS that is formed at the point P by the imaging device C, light that is contained in a solid angle portion where the solid angle RS' and the observation solid angle OS overlap each other, or more specifically, inclusive relations between the observation solid angle OS and the solid angle RS' of the reflected light and between the observation solid angle OS and the solid angle regions RS1 to RS3 within the solid angle RS' are reflected in the brightness of the point P for each of the different optical attributes corresponding to the respective solid angle regions.

That is to say, if a half plane angle of the solid angle RS' of light reflected from the point P is larger than an angle that is obtained by subtracting a half plane angle of the observation solid angle OS from the incline angle 2φ of the reflected light and smaller than the sum of the half plane angle of the observation solid angle OS and the incline angle 2φ of the reflected light, the brightness of the point P changes according to the incline angle 2φ of the reflected light.

However, if the half plane angle of the irradiation solid angle IS is larger than the sum of the half plane angle of the observation solid angle OS and the incline angle 2φ of the reflected light that is generated by the partial incline of the inspection object W, the brightness of the point P remains unchanged. Moreover, if the half plane angle of the observation solid angle OS is larger than the sum of the incline angle 2φ of the reflected light and the half plane angle of the solid angle RS of the reflected light, the brightness of the point P also remains unchanged.

This shows that the brightness of the point P is determined eventually by the inclusive relation between the solid angle RS of the reflected light from the point P and the observation solid angle OS at the point P and that a variation in the brightness of the point P can be controlled by setting a relative relation between the irradiation solid angle IS of the inspection light applied to the point P and the observation solid angle OS at the point P in terms of their shapes, sizes, and inclines.

Furthermore, with reference to FIG. 5, assuming that an irradiation solid angle of light applied to an inspection object contains solid angle regions that have different optical attributes and that are radially present around the optical axis of the irradiation light, how the brightness of a point P on the inspection object varies according to the inclusive relation between the solid angle of reflected light that is reflected from the point P and the observation solid angle that is formed at the point P by the imaging device C will be described in detail.

The inside of the irradiation solid angle IS shown in FIG. 5 is formed of the solid angle regions IS1, IS2, and IS3 having different optical attributes. At this time, the solid angle RS of reflected light that is reflected from the point P on the inspection object W is the same as the irradiation solid angle IS, the optical axis of the solid angle RS and the optical axis of the irradiation solid angle IS are line symmetrical with respect to a normal line to the point P on the inspection object W, and the solid angle regions RS1, RS2, and RS3 are also formed within the solid angle RS of the reflected light, the solid angle regions RS1, RS2, and RS3 corresponding to and having the same optical attributes as the respective solid angle regions IS1, IS2, and IS3, which are formed within the irradiation solid angle and have different optical attributes.

In FIG. 5, for the sake of simplicity, a case in which the observation solid angle OS that is formed at the point P on the inspection object W by the imaging device C has a size that is sufficiently large to capture variations in the solid angle RS of the reflected light and the solid angle regions RS1, RS2, and RS3, which are formed within the solid angle RS of the reflected light and have different optical attributes, is considered. FIG. 11(a) illustrates a case in which the observation solid angle OS is entirely included in the solid angle region RS1. At this time, if the imaging device C is provided with a second filtering means that can selectively detect light rays having different optical properties, the brightness of the point P on the inspection object is a degree of brightness that is expressed by certain proportions of light rays having the optical attribute of the solid angle region RS1, light rays having the optical attribute of the solid angle region RS2, and light rays having the optical attribute of the solid angle region RS3.

Next, as shown in FIG. 5(b), a case in which the surface of the prosecution object W is inclined by φ is considered. In this case, the optical axis of the solid angle RS of the reflected light is inclined by 2φ, and the observation solid angle OS is included in the solid angle regions RS1, RS2, and RS3, which have different optical properties, in certain proportions, and the proportions differ from one another irrespective of the direction in which the optical axis of the solid angle RS of the reflected light is inclined. At this time, the brightness of the point P on the inspection object is captured as a certain degree of brightness based on the certain proportions of the light rays having the optical attributes of the respective solid angle regions RS1, RS2, and RS3, and therefore, based on a variation in the proportions, if the optical axis of the solid angle RS of the reflected light is inclined, both the direction of incline and the degree of incline can be identified irrespective of the direction in which the optical axis is inclined.

Now, in order to facilitate understanding, it is assumed that the solid angle regions RS1, RS2, and RS3 having different optical properties shown in FIG. 5 correspond to, for example, red light, green light, and blue light, respectively, and the imaging device C is a color camera. Then, in the case of FIG. 5(a), at the point P on the inspection object W, red light, green light, and blue light are captured in substantially equal proportions in terms of the area, and accordingly, if the red light, the green light, and the blue light have the same intensity, the point P can be seen in white with a certain degree of brightness, while in the case of FIG. 5(b), the point P can be seen in reddish white with a certain degree of brightness. Moreover, when a case in which the incline angle φ of the inspection object W gradually increases is considered, as the incline angle increases, the point P on the inspection object W continuously changes, gradually turning from white to a red tint. Although an irradiation solid angle in which no solid angle regions having different optical attributes are contained provides only contrast information that is determined by the inclusive relation between that irradiation solid angle and the observation solid angle, the present invention not only makes it possible to continuously capture the incline angle φ of the inspection object W within a wider range, but also makes it possible to identify the directionality of the incline.

Next, in the case where scattered light of object light returned from the inspection object W is mainly observed, the inclusive relation between the irradiation solid angle and the observation solid angle as well as contrast information obtained by the imaging device will be described using FIG. 6.

The inside of an irradiation solid angle IS shown in FIG. 6 is formed of solid angle regions IS1, IS2, and IS3 having different optical attributes. At this time, the brightness of scattered light returned from a point P on an inspection object W is determined, for each of the different optical attributes, based on levels of illuminance determined by angles that are formed by the respective solid angle regions IS1, IS2, and IS3 relative to a normal line to a surface in the vicinity of the point P. If the surface in the vicinity of the point P is inclined by φ, the angles that are formed by the respective solid angle regions IS1, IS2, and IS3 relative to the normal line to the surface in the vicinity of the point P individually vary, and the brightness varies accordingly.

In this case, if the solid angle regions IS1, IS2, and IS3 are arranged radially around the optical axis of the irradiation solid angle IS, the angles that are formed by the respective solid angle regions IS1, IS2, and IS3 relative to the normal line to the surface in the vicinity of the point P individually vary depending on the direction in which the surface in the vicinity of the point P is inclined by φ, and therefore, both the direction of incline and the angle of incline of the surface in the vicinity of the point P can be uniquely identified.

With regard to the irradiation solid angle IS shown in FIG. 6, in FIG. 6(a), solid angle regions IS1, IS2, and IS3 having different optical attributes are arranged contiguously to and radially around the optical axis of the irradiation solid angle IS; in FIG. 6(b), solid angle regions IS1, IS2, and IS3 having different optical attributes are radially arranged only in a peripheral portion of the irradiation solid angle that is spaced apart from the optical axis of the irradiation solid angle IS; and furthermore, in FIG. 6(c), solid angle regions IS1, IS2, and IS3 having different optical attributes are arranged discretely and radially around the optical axis of the irradiation solid angle IS. The smaller the solid angle of the solid angle regions IS1, IS2, and IS3, the more largely the levels of illuminance on the respective solid angle regions vary with respect to the direction of incline and the angle of incline of the surface in the vicinity of the point P of the inspection object, and the amount of variation in the brightness of the point P with respect to any variation in the incline direction and the incline angle can thus be increased. Conversely, the variation in the brightness of the point P with respect to the direction of incline and the angle of incline of the surface in the vicinity of the point P of the inspection object can be controlled by optimizing the arrangement of the solid angle regions IS1, IS2, and IS3 having different optical attributes. That is to say, the amount of variation in the brightness of the point P with respect to any angle of incline in any direction of incline can be controlled.

Next, although the half mirror 4 of the present invention is a very thin circular component supported by a substantially square frame, the shape of the half mirror is not limited to a circle, and the shape of the supporting frame is not limited to a square. With use of this half mirror 4, a separation portion between the front surface, where reflection or transmission occurs, and the back surface of the half mirror 4 can be formed to be very thin, so that ghosts that may be caused by slight refraction, internal reflection, and the like when reflected light from the inspection object W is transmitted through the half mirror 4 can be minimized.

The first shielding mask and the second shielding mask may each be an aperture stop with a plurality of blades, which is a commonly-employed optical material, or may be a combination of a very thin shielding plate having any desired aperture and an aperture stop. Furthermore, a member such as a liquid crystal member may also be used into which the first filtering means or the third filtering means is also combined and in which an aperture and a shielding portion as well as the attribute of light transmitted therethrough can be electronically set.

Moreover, in another embodiment that is different in terms of the aperture of the first shielding mask, for example, the aperture may be formed into an elliptical shape or an elongated slit-like shape, instead of a circular shape. With this configuration, in detection of a feature point on the inspection object, anisotropy can be imparted to the detection sensitivity. That is to say, at this time, the irradiation solid angle at each point on the inspection object spreads out in the same longitudinal direction as the slit of the first shielding mask and is very narrow in the transverse direction. In this case, the detection sensitivity with respect to an incline of the prosecution object in the longitudinal direction is low, and only the detection sensitivity with respect to the transverse direction can be set high. However, in this case, it is necessary to set the shape, size, and incline of the observation solid angle that is formed at each point on the inspection object by the imaging device in accordance with those of the irradiation solid angle with respect to the transverse direction so as to be substantially equal relative to those of the irradiation solid angle. Alternatively, if the size of the observation solid angle that is formed at each point on the inspection object by the imaging device is set to be sufficiently small, a threshold value for the incline to be detected can be set because the irradiation solid angle is widened. The same also applies to solid angle regions that are formed within the irradiation solid angle and that have different optical attributes.

Moreover, in yet another embodiment that is different in terms of the first shielding mask and the third filtering means, for example, the aperture may include a shielding portion and an aperture that are concentric with each other. With this configuration, if appropriate widths thereof are set, with respect to a partial incline of the inspection object, detection of only a certain incline angle range can be performed. Also, if a required width is set in a required direction, anisotropy can be imparted to the detection angle. Furthermore, if a plurality of regions with different optical attributes are set radially and the shapes of those regions are varied, it is possible to extract different incline angles in different incline directions of the inspection surface. Alternatively, if multiple inspection lighting arrangements such as the above-described one are provided, classification and detection can be performed depending on the degree of incline of a surface. In addition, if the above-described member, such as a liquid crystal member, in which electronic setting can be performed is used as the first shielding mask and the third filtering means, a plurality of types of contrast information can be obtained by dynamically switching patterns of an electronically set aperture, so that even more detailed classification and detection can be performed.

Furthermore, with respect to the first filtering means F1, the wavelength band, the polarization state, the luminance, and the like are conceivable as examples of the different optical attributes. For example, when a light source emitting white light is used as the light source 1, the first filtering means F1 can form any desired solid angle regions constituted by light in different wavelength bands. Thus, light with different patterns and different wavelength bands can be simultaneously applied from any direction in any shape, and furthermore, under exactly the same conditions at all the points on the inspection object W within a field-of-view range. In addition, if a member, such as a color liquid crystal member, in which a pattern, the transmittance, or the like can be electronically set is used as the first filtering means F1, a plurality of types of contrast information can be obtained by dynamically switching patterns of the filter, so that even more detailed classification and detection can be performed.

Moreover, as an example configuration of the first filter or the third filter, solid angle regions having different optical attributes may be clearly separated radially, or may have gradations such that the optical attributes are gradually varied.

With this configuration, if, for example, the luminance of light reflected or transmitted by the inspection object differs depending on the irradiation angle or the observation angle, the luminance can be made uniform, or conversely, the luminance can be varied. Furthermore, a variation in the illuminance, which is to be reflected in the luminance of scattered light, can also be controlled in a similar manner.

For example, it is possible to appropriately adjust the difference in luminance between light that is directly reflected from the surface of the inspection object W and light from a portion, such as a flaw, that emits scattered light. This can be realized by reducing the quantity of light in an irradiation solid angle region corresponding to the angular range of light that is directly reflected from the surface of the inspection object W as regularly reflected light, and gradually increasing the quantity of light in the other solid angle regions, and furthermore, irrespective of the incline direction and the incline angle, the quantity of light can be continuously varied in terms of the inclusive relation with the observation solid angle.

Next, with reference to FIGS. 7 to 12, a method will be described with which, in the case where direct light that is regularly reflected light, of object light returned from the inspection object is mainly observed, the three-dimensional shape of a discontinuous region is obtained, the discontinuous region being a region in which the three-dimensional shape of an object surface significantly changes and inclines of minute surfaces in the vicinity of respect points on the object surface cannot be continuously acquired as contrast information of object light returned from the respect points. This method focuses on the fact that the discontinuous region contains a specific region in which irradiation solid angles of irradiation light at respective points on the object surface are not reflected in solid angles of direct light returned from the respective points and obtains the three-dimensional shape of the discontinuous region using variations in the solid angles of the direct light relative to the irradiation solid angles and variations in object light excluding the direct light returned from the discontinuous region.

In FIG. 7, in the case where the optical axes of an irradiation solid angle IS and an observation solid angle OS coincide with each other, when the optical axis of direct light that is returned from the inspection object and in which the shape of the irradiation solid angle IS is reflected varies reflecting an incline of the surface of the inspection object, in order that an angular range in which the variation in the optical axis can be detected using the observation solid angle OS as a variation in the contrast can be obtained in a straightforward manner based on the relation in magnitude between a half plane angle $\theta i$ of the irradiation solid angle IS and a half plane angle $\theta o$ of the observation solid angle OS, the smaller one of the half plane angle $\theta i$ of the irradiation solid angle IS and the half plane angle $\theta o$ of the observation solid angle OS is defined as an effective half plane angle $\theta$.

It should be noted that the irradiation solid angle IS may be an irradiation solid angle in which a plurality of solid angle regions having different optical attributes are radially arranged around the optical axis of the irradiation solid angle. The same holds true for FIGS. 8 to 19, which will be described later.

The inside of the irradiation solid angle IS is formed of solid angle regions IS1, IS2, and IS3 having different optical attributes. At this time, a solid angle RS of reflected light that is reflected from a point P on an inspection object W is the same as the irradiation solid angle IS, and the optical axis of the solid angle RS and the optical axis of the irradiation solid angle IS extend in directions that are line symmetrical with respect to a normal line to the point P on the inspection object W.

Referring to FIG. 8, in the case where object light returned from respective points on the inspection object is direct light, when an irradiation solid angle with a half plane angle $\theta i$, of irradiation light applied to each point on the inspection object and an observation solid angle with a half plane angle $\theta o$ at that point on the inspection object are set such that the optical axes of the irradiation solid angle and the observation solid angle coincide with each other or extend in directions of regular reflection relative to each other, a limit incline angle $\Phi e$ in the vicinity of each point on the inspection object at which direct light returned from that point can be observed using the observation solid angle is ½ of the sum of the half plane angle $\theta i$ of the irradiation solid angle of irradiation light applied to that point on the inspection object and the half plane angle $\theta o$ of the observation solid angle at that point on the inspection object.

Therefore, if a differential angle by which an incline angle $\theta s$ that is formed between an inclined surface of a discontinuous region on the inspection object and a normal line to a planar portion of the inspection object is deviated from 90°, which is the incline angle when that surface is planar, is larger than ½ of the sum of the half plane angle $\theta i$ and the half plane angle $\theta o$, or in other words, if the differential angle is smaller than an angle that is obtained by subtracting the limit incline angle to from 90°, then, in this discontinuous region, the direct light cannot be detected using the observation solid angle, and consequently, the brightness of direct light that can be detected using the observation solid angle is zero. This means that, without any countermeasures, it is impossible to identify the three-dimensional shape of the inspection object in the discontinuous region simply based on the amount of variation in brightness in the observation solid angle.

Figure 9:
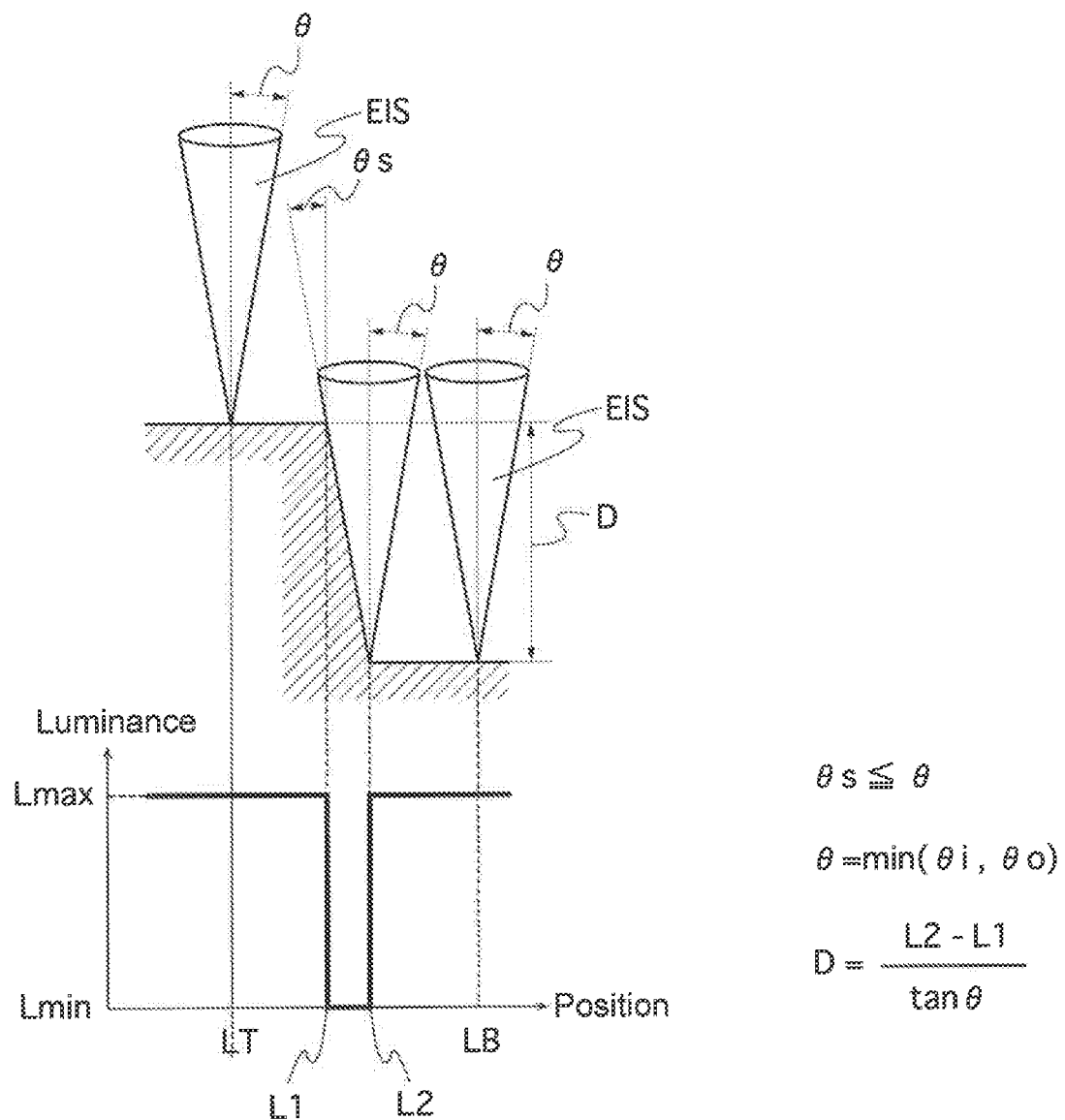
FIG. 9 is a diagram schematically showing a variation in observed luminance of direct light on a neighboring region containing a discontinuous region in which direct light from an inspection object cannot be observed.

Next, FIG. 9 shows a case in which the incline angle θs of the surface of interest of the discontinuous region on the inspection object is equal to the effective irradiation solid angle θ.

Figure 10:
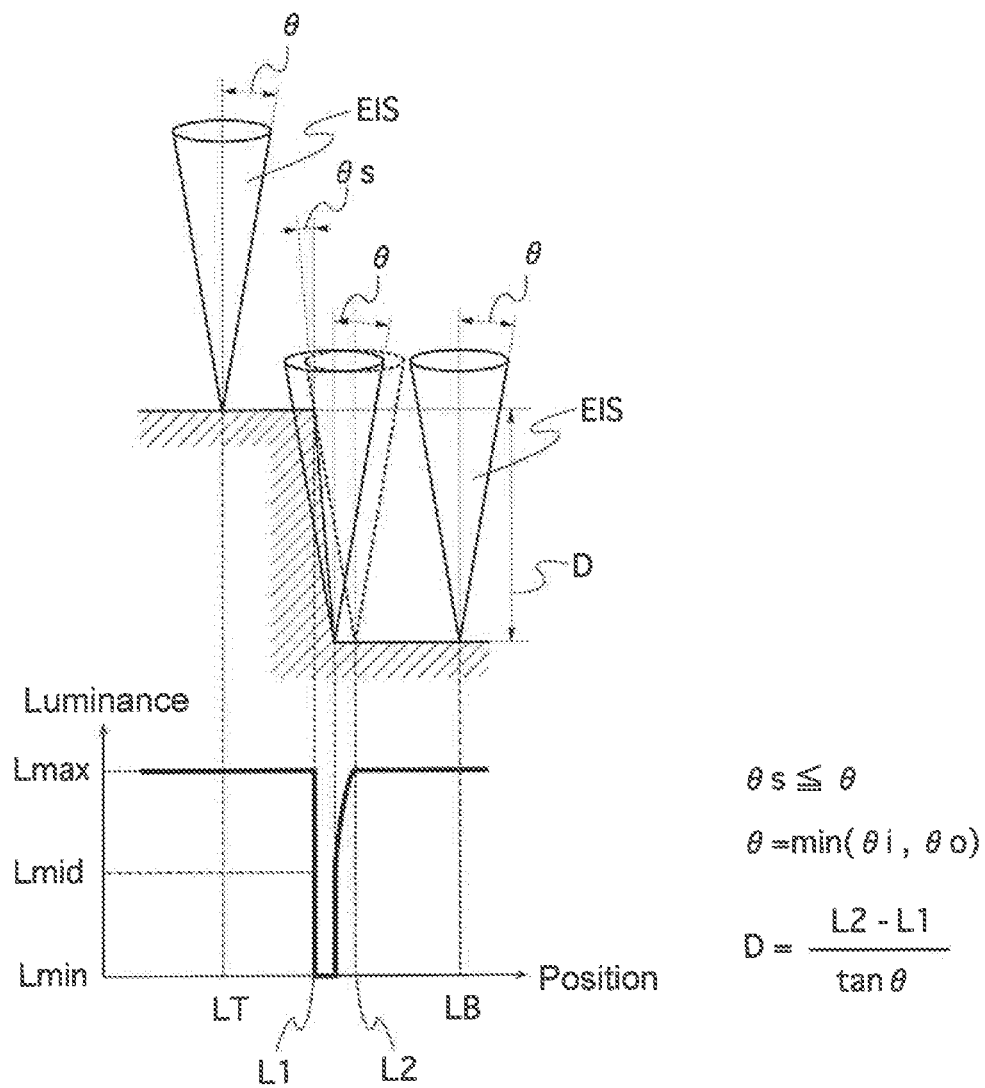
FIG. 10 is a diagram schematically showing a variation in observed luminance of direct light on a neighboring region when an incline angle of a surface of a discontinuous region in which direct light from an inspection object cannot be observed, with respect to the vertical direction is equal to an effective half plane angle.

FIG. 10 shows a case in which the incline angle θs of the surface of the discontinuous region is smaller than the effective irradiation solid angle θ and larger than zero.

Figure 11:
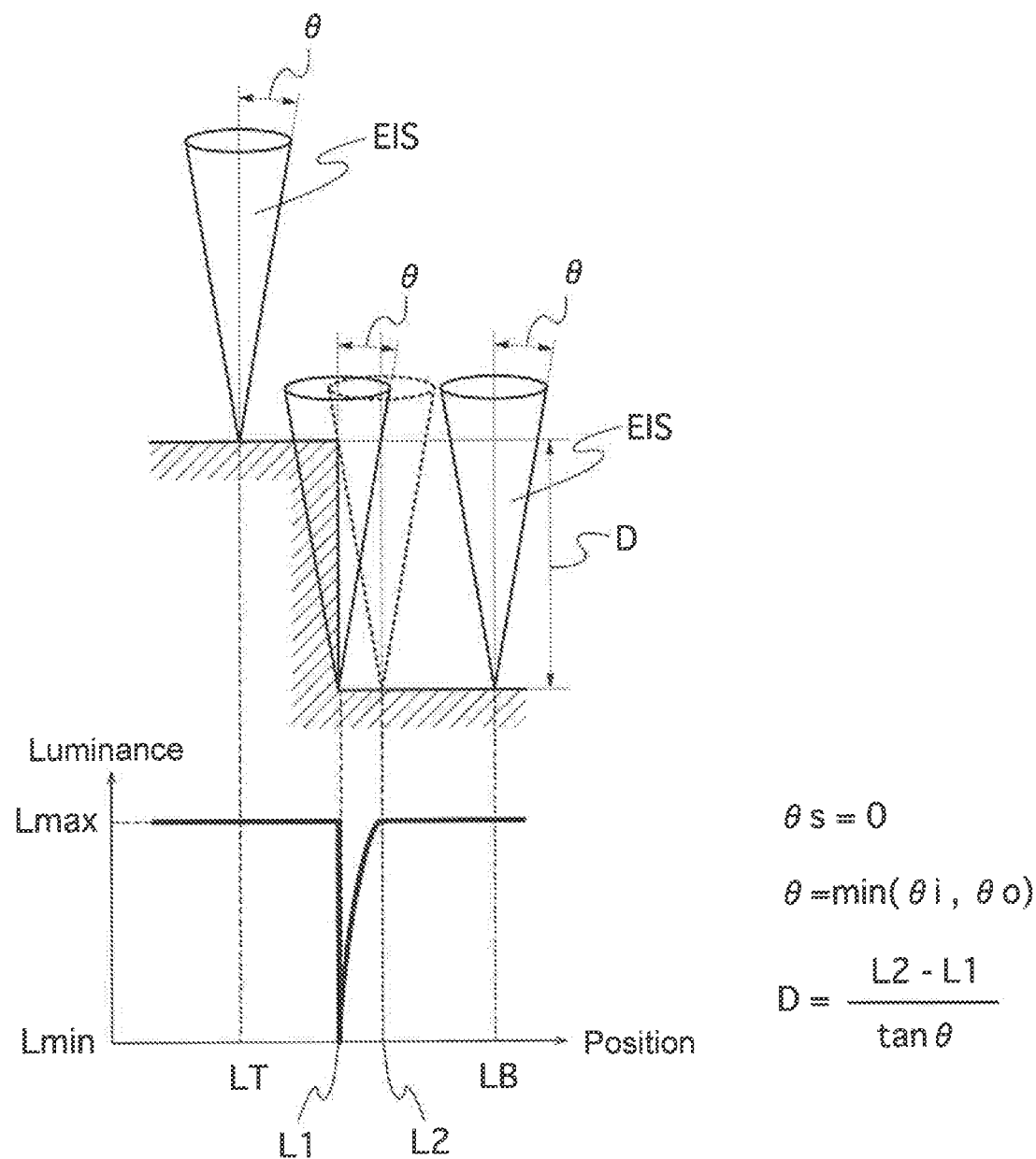
FIG. 11 is a diagram schematically showing a variation in observed luminance of direct light on a neighboring region when the incline angle of a surface of a discontinuous region in which direct light from an inspection object cannot be observed, with respect to the vertical direction is smaller than the effective half plane angle.

FIG. 11 shows a case in which the incline angle θs of the surface of the discontinuous region is zero.

Figure 12:
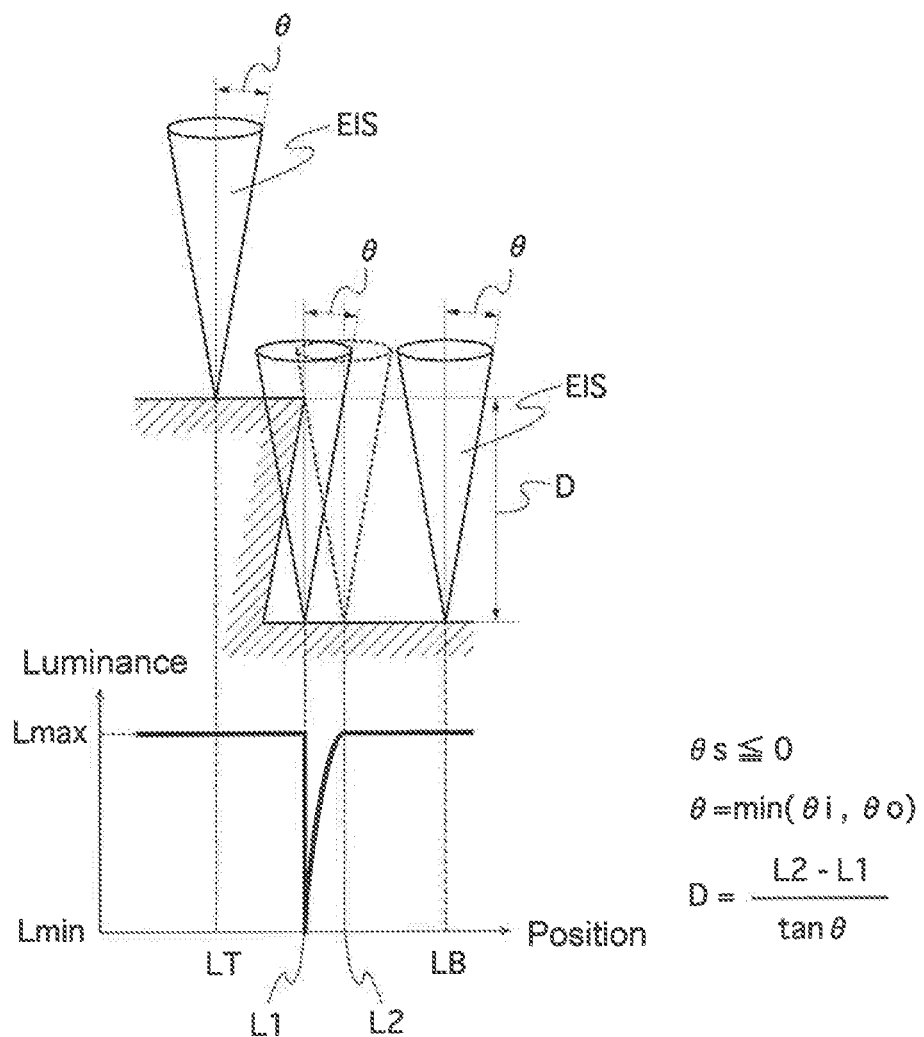
FIG. 12 is a diagram schematically showing a variation in observed luminance of direct light on a neighboring region when the incline angle of a surface of a discontinuous region in which direct light from an inspection object cannot be observed, with respect to the vertical direction is zero degrees.

FIG. 12 shows a case in which the incline angle θs of the surface of the discontinuous region is below zero. All of these diagrams indicate that a value obtained by dividing the width of the discontinuous region that is specified based on a variation in the contrast of direct light detected in the discontinuous region by the tangent of the effective half plane angle θ is a difference D in height between continuous regions that are located on both sides of the discontinuous region.

Next, with reference to FIGS. 13 to 18, a method will be described with which, in the case where a sphere with an unknown radius R, or a portion of the sphere, serving as an example of the discontinuous region is irradiated with irradiation light having an irradiation solid angle with a half plane angle θi, the sphere is then observed using an observation optical system having an observation solid angle with a half plane angle θo, and the optical axes of the irradiation solid angle and the observation solid angle extend in a coinciding direction, the height of a top portion of the sphere, which is an important element of the three-dimensional shape thereof, is identified.

First, in FIGS. 13 to 18, a sphere with a radius R is present on a substantially planar portion of the inspection surface. In this case, if the optical axes of the irradiation solid angle and the observation solid angle coincide with each other, and, in an observation area, the irradiation solid angle and the observation solid angle are set so as to be uniform at respective points with different heights on the inspection surface, the radius R of the sphere can be obtained as a value R1 that is obtained by dividing the radius r1 of a circular area in which direct light returned from the top portion of the sphere is observed by the sine of the limit incline angle Φe.

In addition, in the case where the height of the top portion of the sphere is greater than or equal to the radius of the sphere, the radius R of the sphere can also be obtained as a value R2 of the radius r2 of an area in which no direct light is observed and which is formed outside the circular area of the top portion of the sphere, in which direct light is observed, and the distance from the substantially planar portion of the inspection surface to the center of the sphere can be obtained as a value R3 that is obtained by multiplying a width r3 in which a contrast variation of direct light occurs and which is formed around the area in which no direct light is observed and which is formed outside the circular area of the top portion of the sphere, in which direct light is observed, by the cosine of the effective half plane angle θ, and then dividing the thus obtained product by a value that is obtained by subtracting the cosine of the effective half plane angle θ from the sine of the effective half plane angle θ and adding 1 to the remainder.

In FIG. 13, the optical axes of the irradiation solid angle and the observation solid angle coincide with each other, and a sphere with an unknown radius R is present touching the substantially planar portion of the inspection object.

In this case, a height D of the top portion of the sphere relative to the substantially planar portion can be obtained as a value that is double any of the following values:

R1 described above, which is obtained from the radius r1 of the circular area in which direct light returned from the top portion of the sphere is observed;

R2 described above, which is the radius of the area in which no direct light is observed and which is formed outside the circular area of the top portion of the sphere; and R3 described above, which is obtained from the width r3 in which a contrast variation of direct light occurs and which is formed around the area in which no direct light is observed and which is formed outside the circular area of the top portion of the sphere.

At this time, the values of R1, R2, and R3 are all the same, but if the three values are not the same, this means that the sphere is not a perfect sphere. In general, the value of R1 corresponds to the height from the center of the sphere to the top portion of the sphere, the value of R2 corresponds to the horizontal radius of the sphere from the center of the sphere, and the value of R3 corresponds to the height from the center of the sphere to the surface of the sphere that touches the substantially planar portion of the inspection object. Therefore, it is possible to obtain the position of the sphere relative to the substantially planar portion of the inspection object, and its approximate shape.

Figure 14:
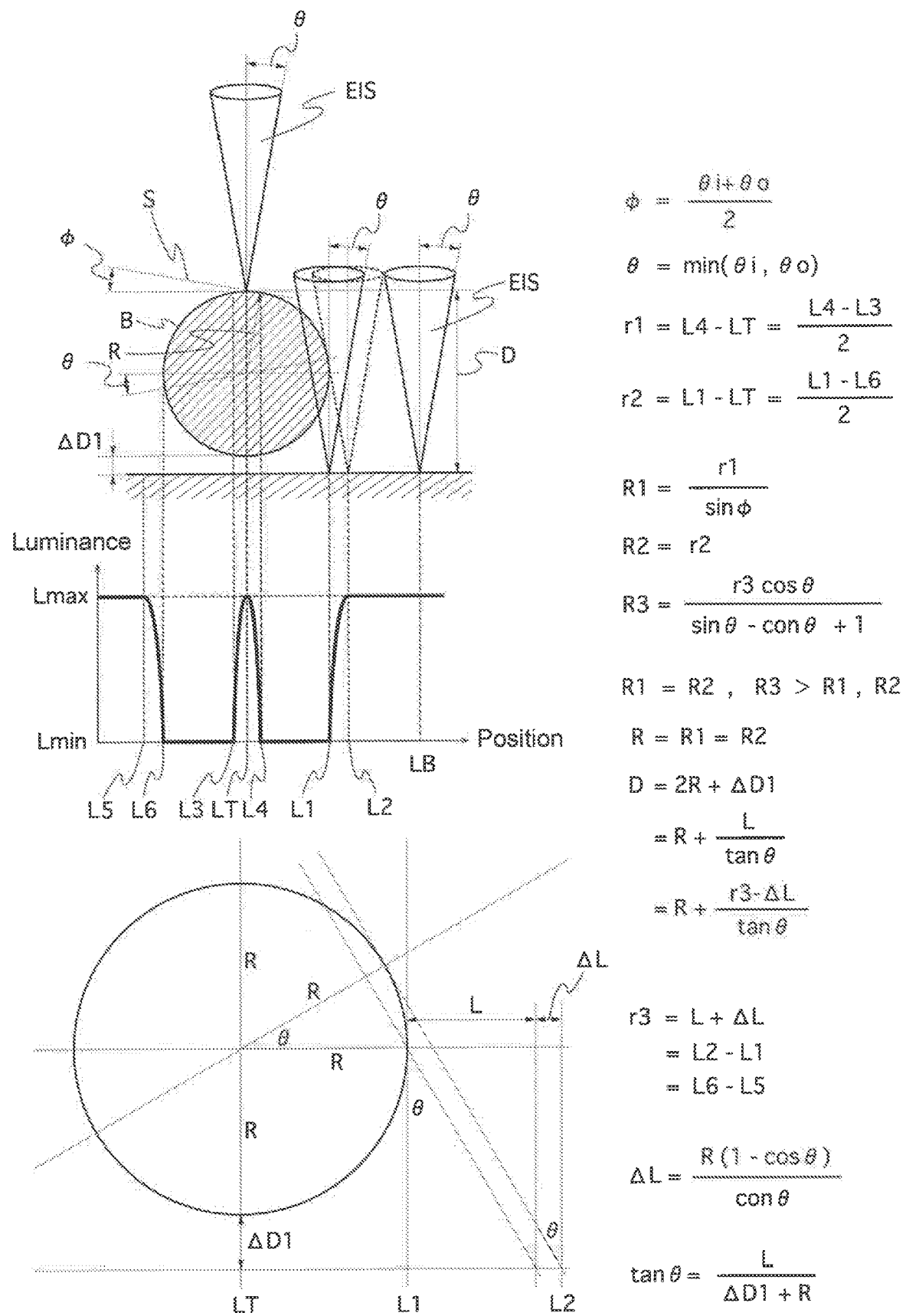
FIG. 14 is a diagram schematically showing a correlation between a variation in luminance of object light on a neighboring region and a three-dimensional shape when a sphere is present touching an inspection object.

FIG. 14 shows a case in which the optical axes of the irradiation solid angle and the observation solid angle coincide with each other, and a sphere with an unknown radius R is present above a substantially planar portion of the inspection object, with the value of the height D of the top portion of the sphere relative to the substantially planar portion being greater than double the radius R of the sphere.

In this case, the values of R1 and R2 are equal to each other, but the value of R3 is observed to be greater than the values of R1 and R2.

The height D can be obtained as a value that is obtained by adding, to the value of R1, or to the value of R2, a value that is obtained by subtracting a correction term ΔL from the value of r3 and then dividing the remainder by the tangent of the effective half plane angle θ, where the correction term ΔL is a value that is obtained by multiplying the radius R of the sphere by the reciprocal of the cosine of the effective half plane angle θ and then by a value that is obtained by subtracting the cosine of the effective half plane angle θ from 1.

Figure 15:
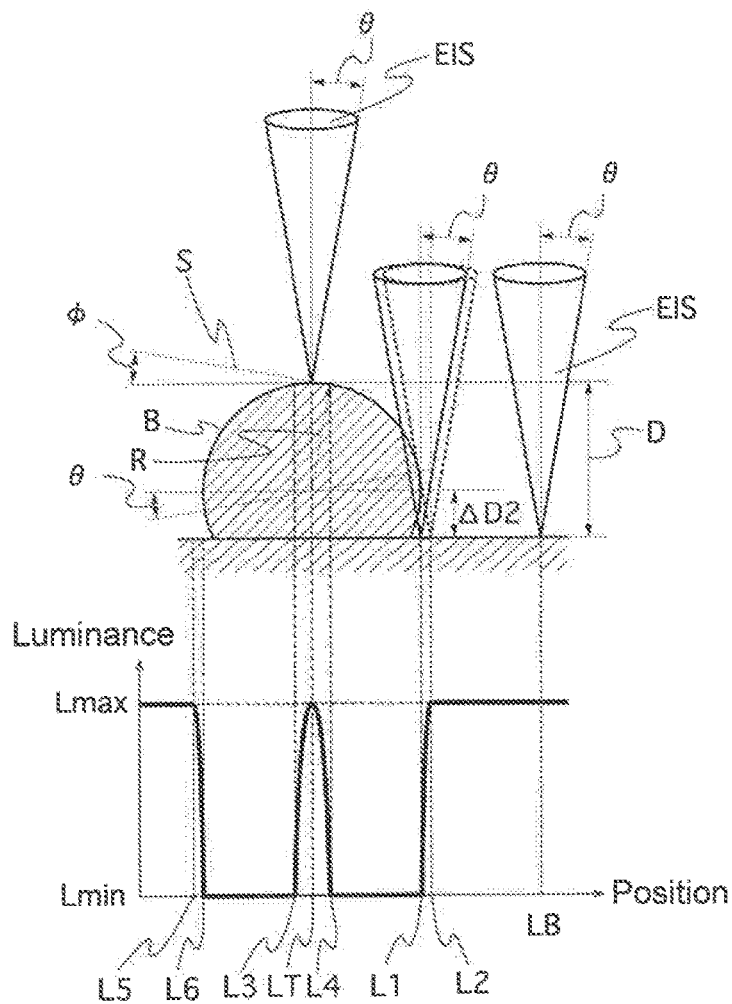
FIG. 15 is a diagram schematically showing a correlation between a variation in luminance of object light on a neighboring region and a three-dimensional shape when a sphere is present spaced apart from an inspection object.

FIGS. 15 and 16 show cases in which the optical axes of the irradiation solid angle and the observation solid angle coincide with each other, and a sphere with a radius R is present on a substantially planar portion of the inspection object, with the value of the height D of the top portion of the sphere relative to the substantially planar portion being smaller than double the radius R of the sphere and greater than or equal to the radius R of the sphere. In these cases, the values of R1 and R2 described above are equal to each other, and the value of R3 described above is observed to be smaller than the values of R1 and R2.

The height D can be obtained as a value that is obtained by adding, to the value of R1, or to the value of R2, a value that is obtained by subtracting the correction term ΔL from the value of r3 and then dividing the remainder by the tangent of the effective half plane angle θ.

FIG. 17 shows a case in which the optical axes of the irradiation solid angle and the observation solid angle coincide with each other, and a sphere with a radius R is present on a substantially planar portion of the inspection object, with the value of the height D of the top portion of the sphere relative to the substantially planar portion being smaller than the radius R of the sphere, the value of R1 is greater than the value of R2, and the value of R3 is observed to be a value that is not zero.

In this case, the height D of the top portion of the sphere can be obtained as a value that is obtained by adding, to the value of R1, a value that is obtained by dividing the correction term $\Delta L$ by the tangent of the effective half plane angle $\theta$.

Finally, FIG. 18 shows a case in which the optical axes of the irradiation solid angle and the observation solid angle coincide with each other, and a sphere with a radius R is present on a substantially planar portion of the inspection object, with the value of the height D of the top portion of the sphere relative to the substantially planar portion being smaller than the radius R of the sphere, the value of R1 is greater than the value of R2, and the value of R3 is observed to be approximately zero. In this case, the height D can be obtained as a value that is obtained by subtracting the square of the value of r2 from the square of the value of R1 and then subtracting the square root of the obtained remainder from the value of R1.

Next, in the case where the discontinuous region does not return mainly direct light but mainly returns scattered light as object light, or in the case where the discontinuous region returns direct light, but the direct light is returned in a directional range in which the returned direct light cannot be detected using the observation solid angle, if irradiation light applied to the observation area is irradiation light that has identical irradiation solid angles $\omega i$, the brightness of a point P when object light is direct light depends on the inclusive relation between the solid angle RS of the direct light and the observation solid angle OS assuming that the reflectance is 1, and the maximum brightness of the point P depends on the effective irradiation solid angle EIS that has the effective half plane angle $\theta$, which is the smaller one of the half plane angles of the irradiation solid angle $\omega i$ and the observation solid angle $\omega o$. On the other hand, when object light is scattered light, light applied to the point P with the irradiation solid angle $\omega i$ is converted to scattered light with a solid angle of $2\pi$, which is in turn detected using the observation solid angle $\omega o$, and therefore, as shown in FIG. 19, the ratio between the maximum brightness of the scattered light detected using the observation solid angle and the maximum brightness of direct light detected using the observation solid angle is a value that is obtained by dividing the larger one of the irradiation solid angle $\omega i$ and the observation solid angle $\omega o$ by $2\pi$ relative to 1.

More specifically, if irradiation light applied to the observation area is irradiation light that has irradiation solid angles with uniform solid angles $\omega i$, and the observation solid angle is $\omega o$, when typical optical requirements are taken into consideration, the half plane angles of the irradiation solid angle and the observation solid angle are about 10° at the maximum, and may be 1° or less if they are small, and the maximum brightness of scattered light observed in that case is from 0.015 to 0.00015 times the maximum brightness of direct light.

At this time, it is possible to set the dynamic range of brightness, that is, the range between the maximum brightness and the minimum brightness, of direct light and the dynamic range of brightness of scattered light to be within ranges where the two dynamic ranges do not overlap each other. Then, for example, an imaging device that retains the brightness of images in a floating-point format can divide the observation area into a bright-field region in which direct light from the inspection object is observed and a dark-field region in which scattered light is observed, perform appropriate arithmetic processing for respective regions to thereby calculate three-dimensional shapes of the respective regions, and then connect the calculated three-dimensional shapes together. In this manner, it is possible to inspect and measure the three-dimensional shape of the surface of the inspection object while reducing discontinuous regions described above as far as possible.

As shown in FIG. 20, respective points in an observation area on an inspection surface W are irradiated with light having identical irradiation solid angles IS in each of which solid angle regions IS1, IS2, and IS3 with different optical attributes are radially arranged, the observation area is then divided into a bright-field region BF that returns direct light and a dark-field region DF that returns scattered light, by setting a threshold for the luminance value or by using the polarization state of object light returned, and a three-dimensional shape is inspected and measured based on a variation in brightness for each of the different optical attributes at respective points in each of the divided regions. In this manner, it is possible to perform continuous inspection and measurement of a three-dimensional shape of an inspection surface whose three-dimensional shape cannot be continuously inspected and measured by observing only direct light or only scattered light.

Respective points in an observation area on an inspection surface W are irradiated with light having identical irradiation solid angles IS in each of which solid angle regions IS1, IS2, and IS3 with different optical attributes are radially arranged, the observation area is then divided into a bright-field region BF that returns direct light and a dark-field region DF that returns scattered light, by setting a threshold for the luminance value or by using the polarization state of object light returned, and a three-dimensional shape is inspected and measured based on a variation in brightness for each of the different optical attributes at respective points in each of the divided regions. In this manner, it is possible to perform continuous inspection and measurement of a three-dimensional shape of an inspection surface whose three-dimensional shape cannot be continuously inspected and measured by observing only direct light or only scattered light.

The reasons why are as follows. With regard to object light returned from an inspection surface when irradiated with irradiation light having identical irradiation solid angles, there is a significant difference in brightness between direct light such as regularly reflected light or regularly reflected light and scattered light other than the direct light, and therefore, by setting a certain threshold for the luminance value observed, or setting a threshold based on the degree of variation in the contrast, and also, for a region in which the luminance value or the degree of variation in the contrast is immediately above or below the threshold, by judging whether this region belongs to a region above the threshold or a region below the threshold, it is possible to distinguish between a region that returns direct light and a region that returns scattered light.

Also, as another method for distinguishing between a region that returns direct light and a region that returns scattered light, since direct light keeps the polarization state of irradiation light, or reflects the polarization state of irradiation light, whereas scattered light, due to its generation mechanism, becomes unpolarized even if irradiation light is polarized, it is possible to observe direct light and scattered light separately, irrespective of the brightness of the object light, using an observation optical system or an imaging device by polarizing irradiation light using, for example, a fourth filter or the like, or it is possible to stabilize the distinction between a region that returns direct light and a region that returns scattered light by increasing the difference in brightness between the dynamic ranges of direct light and scattered light using parallel Nicols.

Moreover, in order to stably analyze a variation in the luminance value of direct light and scattered light, a plurality of images are captured while varying the imaging conditions such as the exposure time or the gain, and a region in which brightness is saturated and thus a variation in brightness cannot be detected and a portion in which brightness is too low and thus a variation in brightness cannot be detected are identified, and after that, it is possible to complement both and thereby stably analyze the variations.

As yet another method, if the imaging device retains the luminance values of the image in a floating-point format, it is possible to perform stable three-dimensional analysis for each region.

Moreover, since the second shielding mask is imaged onto the inspection object, it is possible to set a specific optical attribute for each irradiation area of the inspection light by providing, in the aperture of the shielding mask, the fourth filtering means that transmits only light having a specific attribute. At this time, if it is unnecessary to set a range that is not to be irradiated, an irradiation area may be set using only the fourth filtering means, for each specific optical attribute of light transmitted therethrough.

Furthermore, if the above-described member such as a liquid crystal member in which an aperture can be electronically set is used as the first and second shielding masks, and the first and third filters, the irradiation region of the inspection light can be changed by dynamically switching the patterns of the aperture, the optical attributes of light transmitted, and the like, so that even when the inspection object requires different irradiation regions, each of these regions can be irradiated with inspection light appropriate for that area, whereby a plurality of types of contrast information can be obtained.

Furthermore, if the surface light source is configured by combining a color liquid crystal or the like that is capable of dynamically changing the emission light wavelength distribution, the luminance distribution, and the polarization state distribution on the irradiating face of the surface light source with a white light source, an even wider variety of inspection objects can be supported.

Aside from the above, various modifications and combinations of embodiments can be made without departing from the gist of the present invention. An example thereof is a configuration in which an observation solid angle that is sufficiently small compared with the solid angle of object light returned from each point on an inspection object is used, and the entire region of each irradiation solid angle is divided into small regions corresponding to the size of this observation solid angle to achieve different optical properties for required portions, so that only a region with a specific direction of incline and a specific degree of incline, of an inclined surface of the inspection object, can be captured.

It should be noted that, although the terms such as "luminance", "illuminance", and "brightness" used in the foregoing description are generally luminous quantities that are measures of light perceived by the human vision, such terms may have been used as physical quantities or used to mean sensor luminous quantities adapted to the sensitivity characteristics of a camera that is used.

LIST OF REFERENCE NUMERALS

100: Inspection and measurement lighting device
200: Inspection and measurement system
300: Image analyzing means
1: Surface light source
11: Light-emitting face
2: Lens
4: Half mirror
C: Imaging device
LP1: Irradiation light path
LP2: Reflection/transmission light path
M1: First shielding mask (and its shielding portion)
M2: Second shielding mask
F1: First filtering means
F3: Third filtering means
F4: Fourth filtering means
F11: Portion of first filtering means that transmits light having certain optical attribute 1
F12: Portion of first filtering means that transmits light having certain optical attribute 2
F13: Portion of first filtering means that transmits light having certain optical attribute 3
W: Inspection object
P: Certain point on inspection object W
IS: Irradiation solid angle
IS1: Solid angle region 1 having specific optical attribute within irradiation solid angle
IS2: Solid angle region 2 having specific optical attribute within irradiation solid angle
IS3: Solid angle region 3 having specific optical attribute within irradiation solid angle
EIS: Effective irradiation solid angle having effective half plane angle
OS: Observation solid angle
RS: Solid angle of reflected light
RS1: Solid angle region 1 having specific optical attribute within solid angle of reflected light
RS2: Solid angle region 2 having specific optical attribute within solid angle of reflected light
RS3: Solid angle region 3 having specific optical attribute within solid angle of reflected light
$\Phi$: Incline angle of inspection surface
$\Phi e$: Limit incline angle of inspection surface at which direct light can be observed
$\theta o$: Half plane angle of observation solid angle
$\theta i$: Half plane angle of irradiation solid angle
$\omega o$: Solid angle of observation solid angle
$\omega i$: Solid angle of irradiation solid angle
$\theta$: Effective half plane angle of irradiation solid angle and observation solid angle
$\theta s$: Incline angle of inspection surface with respect to vertical direction
D: Height of inspection surface from reference surface, the inspection surface having different height
$\Delta D1$: Distance between bottom of sphere and inspection reference surface
$\Delta D2$: Distance from inspection reference surface to center of sphere
$\Delta D3$: Distance from inspection reference surface to center of sphere
L1 to L4: Horizontal position in discontinuous region on inspection surface
B: Sphere with radius R
R: Radius of sphere B
S: Tangent line to sphere B having incline $\Phi e$ with respect to horizontal direction
LT: Position of top of spherical portion
LB: Position of reference planar portion on inspection surface L: Horizontal distance for which effective irradiation solid angle is partially missing in discontinuous region on inspection surface r1: Radius of circular area in which direct light returned from top portion of spherical portion is observed r2: Radius of area in which direct light returned from spherical portion is not observed r3: Width in which brightness of direct light varies and which is formed around area in which direct light returned from spherical portion is not observed R1: Value that is obtained from radius of circular area in which direct light returned from top portion of spherical portion is observed and that corresponds to height from center of sphere to top of sphere R2: Value that is obtained from radius of area in which direct light returned from spherical portion is not observed and that corresponds to horizontal radius of sphere from center of sphere R3: Value that is obtained from width in which brightness of direct light varies and which is formed around area in which direct light returned from spherical portion is not observed and that corresponds to height from center of sphere to touching surface of sphere that touches inspection surface BF: Bright-field region that returns direct light DF: Dark-field region that returns scattered light

FIG. 1

In outer housing of device, as shown by dashed lines, positions of first shielding mask M1 including first filtering means F1 and third filtering means F3, second shielding mask M2 including fourth filtering means, and surface light source 1 including light-emitting face 11 can each be adjusted by being moved forward and rearward relative to lens 2, and can be fixed.

FIG. 2

Focus position of lens 2

Half mirror 4, imaging device C, inspection object W, and light path in the case where half mirror is provided are indicated by dashed lines.

FIG. 3

Focus position of lens 2

FIG. 4

M1: Shielding portion

F13, F12, F11: Portions that each transmit only light having specific wavelength band or polarization or that each have specific transmittance First shielding mask M1 denotes mask of shielding portion, first filtering means F1 denotes portion, within aperture, that transmits only light having specific wavelength band or polarization or that has specific transmittance, and third filtering means F3 denotes irradiation solid angle forming means as a whole that integrates both.

Except for first shielding mask, M1 of shielding portion may also function as portion that transmits only light having specific wavelength band or polarization or that has specific transmittance.

FIG. 5

(a) When inspection surface is planar, optical axis of reflected light and optical axis of observation solid angle coincide with each other.

(b) When inspection surface is inclined, optical axis of reflected light is shifted from optical axis of observation solid angle.

FIG. 6

(a) IS1 to IS3 are radially and continuously arranged.

(b) IS1 to IS3 are radially and continuously arranged in peripheral portion of irradiation solid angle.

(c) IS1 to IS3 are radially and discretely arranged.

FIG. 7

Effective half plane angle: $\theta=\min(\theta i, \theta o)$

If optical axes of irradiation solid angle and observation solid angle coincide with each other, or extend in directions of regular reflection, with regard to direct light returned from object, object light corresponding to effective irradiation solid angle EIS that varies within range of effective half plane angle $\theta$ that is smaller one of half plane angle $\theta i$ of irradiation solid angle and half plane angle $\theta o$ of observation solid angle can be sensed as contrast information thereof.

FIG. 8

Luminance

Position

D=unfixed

FIG. 9

Luminance

Position

FIG. 10

Luminance

Position

FIG. 11

Luminance

Position

FIG. 12

Luminance

Position

FIG. 13

Luminance

Position

FIG. 14

Luminance

Position

FIG. 15

Luminance

Position

FIG. 16

Luminance

Position

FIG. 17

Luminance

Position

FIG. 18

Luminance

Position

FIG. 19

Effective half plane angle: $\theta=\min(\theta i, \theta o)$ (a) When object light is direct light Solid angle of scattered light: $\omega=2\pi$ (b) When object light is scattered light When object light is direct light, brightness of point P depends on inclusive relation between solid angle RS of direct light and observation solid angle OS assuming that reflectance is 1, and maximum brightness of point P depends on effective irradiation solid angle EIS that has effective half plane angle $\theta$ that is the smaller one of half plane angles of irradiation solid angle $\omega i$ and observation solid angle $\omega o$, while when object light is scattered light, since light applied to point P with irradiation solid angle $\omega i$ is converted to substantially homogeneous scattered light with solid angle of $2\pi$, which is in turn detected using observation solid angle $\omega o$, brightness thereof is determined by value obtained by dividing product of $\omega i$ and $\omega o$ by $2\pi$, and therefore, ratio between maximum brightness of scattered light detected using observation solid angle and maximum brightness of direct light detected using observation solid angle is a value that is obtained by dividing the larger one of irradiation solid angle ωi and observation solid angle ωo by 2π relative to 1.

FIG. 20

If respective points in observation area on inspection surface W are irradiated with light having identical irradiation solid angles IS in each of which solid angle regions IS1, IS2, and IS3 with different optical attributes are radially arranged, observation area is divided into bright-field region BF that returns direct light and dark-field region DF that returns scattered light, by setting threshold for luminance value or by using polarization state of object light returned, and three-dimensional shape is inspected and measured based on variation in brightness for each of the different optical attributes at respective points in each of divided regions, and, in this manner, it is possible to perform continuous inspection and measurement of three-dimensional shape of inspection surface whose three-dimensional shape cannot be continuously inspected and measured by observing only direct light or only scattered light.

The invention claimed is:

1. An inspection and measurement system comprising:
a lighting device having a surface light source configured to irradiate an inspection object with inspection light, the lighting device being capable of rendering shapes, and inclines of optical axes, of irradiation solid angles of the inspection light applied to respective points on the inspection object substantially uniform at all the respective points on the inspection object at the same time irrespective of distances from the lighting device to the respective points on the inspection object; and
an imaging device which is a camera configured to image object light including regularly reflected light or regularly transmitted light or scattered light reflected or transmitted by the respective points on the inspection object,
the inspection and measurement system being configured to identify incline angles of surfaces in the vicinity of respective points on the inspection object by sensing a variation in optical axes of solid angles of the regularly reflected light or the regularly transmitted light at the respective points on the inspection object as brightness thereof, based on inclusive relations with observation solid angles formed at the respective points on the inspection object by the imaging device, or by sensing a variation in illuminance of the inspection light at the respective points on the inspection object as a variation in brightness of the scattered light,
wherein, in a region in which incline angles cannot be continuously identified, a variation in the solid angles of the regularly reflected light or the regularly transmitted light in the vicinity of that region is sensed as brightness thereof based on the inclusive relations with the observation solid angles, and at least a difference in height between regions adjacent to that region is calculated using information regarding the sensed brightness, information regarding a geometric shape of that region, and an effective half plane angle in which both the irradiation solid angle and the observation solid angle function effectively, and thereby three-dimensional characteristics of a surface of the inspection object can be specified.

2. The inspection and measurement system according to claim 1, the inspection and measurement system being configured such that:
the irradiation solid angles of the inspection light applied to the respective points on the inspection object are set such that, in each irradiation solid angle, a plurality of solid angle regions having different optical attributes are radially arranged around an optical axis thereof, and
the imaging device is capable of selectively imaging different optical attributes of the object light, and incline angles, or both the incline angles and incline directions, of surfaces in the vicinity of the respective points on the inspection object are identified by the imaging device sensing a variation in the optical axes of the solid angles of the regularly reflected light or the regularly transmitted light at the respective points on the inspection object, based on the inclusive relations with the observation solid angles formed at the respective points on the inspection object by the imaging device, as a variation in brightness for each of the optical attributes resulting from the plurality of solid angle regions of the inspection light, or by the imaging device sensing a variation in illuminance at the respective points on the inspection object for each of the optical attributes resulting from the plurality of solid angle regions of the inspection light as a variation in brightness of the scattered light for each optical attribute,
wherein, in a region in which incline angles cannot be continuously identified, a variation in the solid angles of the regularly reflected light or the regularly transmitted light in the vicinity of that region is sensed as a variation in brightness for each of the optical attributes resulting from the plurality of solid angle regions of the inspection light, and at least a difference in height between regions adjacent to that region is calculated, and thereby three-dimensional characteristics of a surface of the inspection object can be specified.

3. The inspection and measurement system according to claim 2,
wherein the observation solid angles at the respective points on the inspection object are each set to be smaller than a corresponding irradiation solid angle, and, in the plurality of solid angle regions that are formed in the irradiation solid angle and that have different optical attributes, the optical attributes are each continuously and smoothly varied.

4. The inspection and measurement system according to claim 1,
wherein, in the lighting device configured to irradiate an inspection object with inspection light, the inspection light applied to respective points on the inspection object is polarized,
the imaging device configured to image object light reflected or transmitted by the respective points on the inspection object is capable of selectively imaging a variation in the object light based on a polarization state of the object light, and the object light returned from the respective points on the inspection object is classified into regularly reflected light or regularly transmitted light, or scattered light,
if the object light is regularly reflected light or regularly transmitted light, brightness thereof is sensed based on the inclusive relations with the observation solid angles formed at the respective points on the inspection object by the imaging device, if the object light is scattered light, a variation in brightness with respect to the scattered light is sensed, and thereby three-dimensional characteristics of a surface of the inspection object can be specified.

5. The inspection and measurement system according to claim 1,
wherein the imaging device configured to image object light reflected or transmitted by respective points on the inspection object is capable of imaging and recording brightness of the object light as a luminance value in a floating-point format,
whether the object light returned from the respective points on the inspection object is regularly reflected light or regularly transmitted light, or scattered light can be determined as being a region that is divided according to a band of brightness thereof,
if the object light is regularly reflected light or regularly transmitted light, brightness thereof is sensed based on the inclusive relations with the observation solid angles formed at the respective points on the inspection object by the imaging device,
if the object light is scattered light, a variation in brightness with respect to the scattered light is sensed, and thereby three-dimensional characteristics of a surface of the inspection object can be specified.

6. The inspection and measurement system according to claim 1,
wherein, in the imaging device configured to image object light reflected or transmitted by respective points on the inspection object,
a first captured image is captured by applying imaging conditions within a range in which desired brightness of regularly reflected light or regularly transmitted light of the object light does not exceed the maximum brightness that can be imaged,
a second captured image is captured by applying imaging conditions within a range in which desired brightness of scattered light of the object light is equal to or higher than the minimum brightness that can be imaged,
whether the object light returned from the respective points on the inspection object is regularly reflected light or regularly transmitted light, or scattered light can be determined as being a region that is divided according to a band of brightness thereof,
if the object light is regularly reflected light or regularly transmitted light, brightness thereof is sensed based on the inclusive relations with the observation solid angles formed at the respective points on the inspection object by the imaging device,
if the object light is scattered light, a variation in brightness with respect to the scattered light is sensed, and thereby three-dimensional characteristics of a surface of the inspection object can be specified.

7. The inspection and measurement system according to claim 1,
wherein, in the lighting device, a half mirror configured to change an irradiation direction of the inspection light and to transmit light from the inspection object so that the light can be imaged by the imaging device is provided, and the optical axes of the irradiation solid angles of the inspection light at the respective points on the inspection object substantially coincide with optical axes of the observation solid angles of the imaging device at the respective points on the inspection object.

8. An inspection and measurement method for identifying a three-dimensional shape of an inspection object using the inspection system according claim 1,
wherein a three-dimensional shape of an inspection object is identified based on a variation in at least one of brightness, shapes of solid angles, and inclines of the solid angles of the object light.

* * * * *